US012014690B2

(12) United States Patent
Jeong et al.

(10) Patent No.: US 12,014,690 B2
(45) Date of Patent: Jun. 18, 2024

(54) DISPLAY DEVICE HAVING A PLURALITY OF SUB DATA LINES CONNECTED TO A PLURALITY OF SUBPIXELS

(71) Applicant: LG Display Co., Ltd., Seoul (KR)

(72) Inventors: YoungMin Jeong, Paju-si (KR); SeungHwan Shin, Jeongu-si (KR); WonHo Lee, Paju-si (KR); Wondoo Kim, Gimpso-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/093,243

(22) Filed: Jan. 4, 2023

(65) Prior Publication Data

US 2023/0154413 A1 May 18, 2023

Related U.S. Application Data

(62) Division of application No. 17/389,051, filed on Jul. 29, 2021, now Pat. No. 11,574,603.

(30) Foreign Application Priority Data

Jul. 30, 2020 (KR) ........................ 10-2020-0095319
Dec. 31, 2020 (KR) ........................ 10-2020-0189235

(51) Int. Cl.
*G09G 3/3275* (2016.01)
*G09G 3/3233* (2016.01)
*G09G 3/3266* (2016.01)

(52) U.S. Cl.
CPC ......... *G09G 3/3275* (2013.01); *G09G 3/3233* (2013.01); *G09G 3/3266* (2013.01); *G09G 2300/0452* (2013.01); *G09G 2300/0842* (2013.01); *G09G 2320/041* (2013.01)

(58) Field of Classification Search
CPC .................................................... G09G 3/3275
USPC .......................................................... 345/694
See application file for complete search history.

(56) References Cited

U.S. PATENT DOCUMENTS 8,384,708 B2 2/2013 Moon
9,019,187 B2 4/2015 Moon et al.
2008/0252624 A1* 10/2008 Jang .................... G09G 3/3648 345/204

(Continued)

FOREIGN PATENT DOCUMENTS

CN 101763837 A 6/2010
CN 106932936 A 7/2017

(Continued)

*Primary Examiner* — Long D Pham
(74) *Attorney, Agent, or Firm* — Birch, Stewart, Kolasch & Birch, LLP

(57) ABSTRACT

A display device can include a display panel having plurality of pixels, each including sub pixels having different colors; a data driver to supply a data voltage to the pixels by using a plurality of data lines; and a gate driver to supply a gate signal to the pixels using a plurality of gate lines. Also, each of the data lines is divided into a plurality of sub data lines, and each of the sub data lines is connected to sub pixels having the same color, sub pixels having the same color are disposed in a same column, and the sub pixels in the same column are connected to each of the sub data lines, and the number of sub data lines branching from one of a data line has the same number of gate lines which is connected to the plurality of pixels in a same row.

14 Claims, 13 Drawing Sheets

(56) References Cited

U.S. PATENT DOCUMENTS

| | | | | |
|---|---|---|---|---|
| 2013/0222216 | A1 | 8/2013 | Park et al. | |
| 2015/0187304 | A1 | 7/2015 | Ko et al. | |
| 2016/0268308 | A1 | 9/2016 | Cho et al. | |
| 2017/0221399 | A1 | 8/2017 | Yan | |
| 2017/0323606 | A1* | 11/2017 | Wang .................. | G09G 3/3685 |
| 2018/0090069 | A1 | 3/2018 | Hwang et al. | |
| 2019/0164502 | A1 | 5/2019 | Yoon et al. | |
| 2019/0197959 | A1 | 6/2019 | Noh et al. | |
| 2020/0160768 | A1 | 5/2020 | Wang et al. | |
| 2020/0211486 | A1 | 7/2020 | Wang et al. | |

FOREIGN PATENT DOCUMENTS

| | | | |
|---|---|---|---|
| KR | 10-2011-0014016 | A | 2/2011 |
| KR | 10-2014-0042455 | A | 4/2014 |
| KR | 10-2015-0054555 | A | 5/2015 |
| KR | 10-2020-0050871 | A | 5/2020 |

* cited by examiner

DISPLAY DEVICE HAVING A PLURALITY OF SUB DATA LINES CONNECTED TO A PLURALITY OF SUBPIXELS

CROSS-REFERENCE TO RELATED APPLICATIONS

This application is a Divisional application of U.S. patent application Ser. No. 17/389,051 filed on Jul. 29, 2021, which claims the priority to Korean Patent Application No. 10-2020-0095319 filed on Jul. 30, 2020 and Korean Patent Application No. 10-2020-0189235 filed on Dec. 31, 2020, both in the Republic of Korea, and the entire contents of all these applications are incorporated herein by reference into the present application.

BACKGROUND

Field

The present disclosure relates to a display device, and more particularly, to a display device which is capable of minimizing data transition.

Description of the Related Art

As display devices which are used for a monitor of a computer, a television, or a cellular phone, there are an organic light emitting display device (OLED) which is a self-emitting device and a liquid crystal display device (LCD) which requires a separate light source.

Among various display devices, an organic light emitting display device includes a display panel including a plurality of sub pixels and a driver which drives the display panel. The driver includes a gate driver configured to supply a gate signal to the display panel and a data driver configured to supply a data voltage. When a signal such as a gate signal and a data voltage is supplied to a sub pixel of the organic light emitting display device, the selected sub pixel emits light to display images.

Further, a data voltage to be applied to a sub pixel is determined in accordance with a connection relationship of the sub pixel and a data line. For example, the data transition of the data voltage can frequently occur in accordance with the connection relationship of the sub pixel and the data line.

In recent years, one horizontal period becomes short for high speed driving of 120 Hz, so that when the data transition of the data voltage frequently occurs, there may be an issue in that the data voltage may not be sufficiently charged for one horizontal period. Further, when the data transition of the data voltage frequently occurs, there can be an issue in that the data driver configured to supply the data voltage can be seriously heated.

SUMMARY OF THE INVENTION

An object to be achieved by the present disclosure is to provide a display device which fully charges a data voltage in a sub pixel for one horizontal period.

Another object to be achieved by the present disclosure is to provide a display device which can minimize heating of the data driver.

Objects of the present disclosure are not limited to the above-mentioned objects, and other objects, which are not mentioned above, can be clearly understood by those skilled in the art from the following descriptions.

In order to achieve the above-described object, according to an aspect of the present disclosure, a display device includes a display panel in which a plurality of pixels including a first sub pixel, a second sub pixel, a third sub pixel, and a fourth sub pixel each having a different color are disposed; a data driver configured to supply a data voltage to the plurality of pixels by using a plurality of data lines; and a gate driver configured to supply a gate signal to the plurality of pixels by using a plurality of gate lines, each of the plurality of data lines is divided into a plurality of sub data lines and each of the plurality of sub data lines is connected to a plurality of sub pixels having the same color, thereby minimizing data transition of a data voltage.

According to another aspect of the present disclosure, a display device includes: a display panel in which a plurality of sub pixels having different colors is disposed; a data driver configured to supply a data voltage to the plurality of sub pixels by using a plurality of data lines; and a gate driver configured to supply a gate signal to the plurality of sub pixels by using a plurality of gate lines, each of the plurality of data lines is divided into a plurality of sub data lines and each of the plurality of sub data lines is connected to sub pixels having the same color. The plurality of gate lines includes a first gate line disposed on one side of a plurality of sub pixels disposed in odd-numbered rows, a second gate line and a third gate line disposed between a plurality of sub pixels disposed in the odd-numbered rows and a plurality of sub pixels disposed in even-numbered rows; and a fourth gate line disposed on the other side of the plurality of sub pixels disposed in even-numbered rows, a plurality of sub pixels disposed in a 12 k-11-th column to a 12 k-6-th column is disposed to be more adjacent to the first gate line and the fourth gate line than the second gate line and the third gate line, and a plurality of sub pixels disposed in a 12 k-5-th column to a 12 k-th column is disposed to be more adjacent to the second gate line and the third gate line than the first gate line and the fourth gate line. Therefore, even though the overlay of the sub pixels varies, the image can be uniform.

Other detailed matters of the exemplary embodiments are included in the detailed description and the drawings.

According to the present disclosure, the data voltage can be fully charged for one frame so that an image quality can be improved.

According to the present disclosure, a data voltage is constantly maintained for one frame so that the heating issue of the data driver configured to supply a data voltage can be solved or addressed.

Further, according to the present disclosure, a load of the data driver and a load of a MUX are reduced to drive the display device at a high speed.

Further, according to the present disclosure, the occurrence of vertical lines or horizontal lines due to overlay variation can be suppressed.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
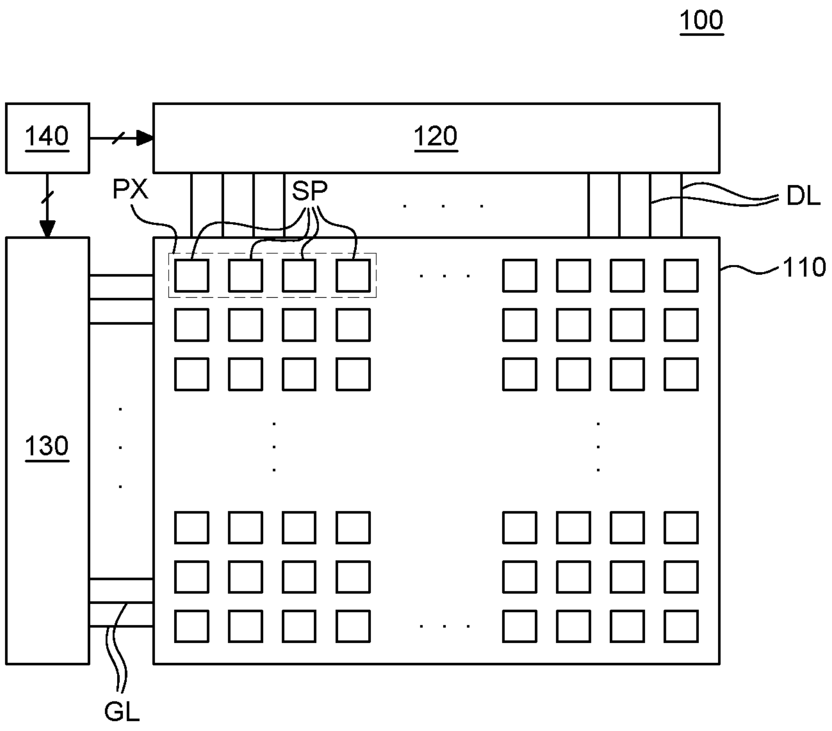
FIG. 1 is a schematic view of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components and may not define order. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

A transistor used for the display device of the present disclosure can be implemented by one or more transistors of re-channel transistors (NMOS) and p-channel transistors (PMOS). The transistor can be implemented by an oxide semiconductor transistor having an oxide semiconductor as an active layer or an LTPS transistor having a low temperature poly-silicon (LTPS) as an active layer. The transistor can include at least a gate electrode, a source electrode, and a drain electrode. The transistor can be implemented by a thin film transistor (TFT) on a display panel. In the transistor, carriers flow from the source electrode to the drain electrode. In the case of the n-channel transistor (NMOS), since the carriers are electrons, in order to allow the electrons to flow from the source electrode to the drain electrode, a source voltage can be lower than a drain voltage. A direction of the current in the n-channel transistor NMOS flows from the drain electrode to the source electrode and the source electrode can serve as an output terminal. In the case of the p-channel transistor (PMOS), since the carriers are holes, in order to allow the holes to flow from the source electrode to the drain electrode, a source voltage is higher than a drain voltage. In the p-channel transistor PMOS, the holes flow from the source electrode to the drain electrode so that current flows from the source to the drain and the drain electrode serves as an output terminal. Accordingly, the source and the drain can be changed in accordance with the applied voltage so that it should be noted that the source and the drain of the transistor are not fixed. In the present specification, it is assumed that the transistor is an n-channel transistor (NMOS), but is not limited thereto so that the p-channel transistor can be used and thus a circuit configuration can be changed.

A gate signal of transistors which are used as switching elements swings between a gate-on voltage and a gate-off voltage. The gate-on voltage is set to be higher than a threshold voltage Vth of the transistor and the gate-off voltage is set to be lower than the threshold voltage Vth of the transistor. The transistor is turned on in response to the gate-on voltage and is turned off in response to the gate-off voltage. In the case of the NMOS, the gate-on voltage can be a gate high voltage VGH and the gate-off voltage can be a gate low voltage VGL. In the case of the PMOS, the gate-on voltage can be a gate low voltage VGL and the gate-off voltage can be a gate high voltage VGH.

Hereinafter, various exemplary embodiments of the present disclosure will be described in detail with reference to accompanying drawings. Further, all the components of each display device according to all embodiments of the present disclosure are operatively coupled and configured.

FIG. 1 is a schematic view of a display device according to an exemplary embodiment of the present disclosure.

Referring to FIG. 1, a display device 100 includes a display panel 110, a gate driver 120, a data driver 130, and a timing controller 140.

The display panel 110 is a panel for displaying images. The display panel 110 can include various circuits, wiring lines, and light emitting diodes disposed on the substrate. The display panel 110 is divided by a plurality of data lines DL and a plurality of gate lines GL intersecting each other and includes a plurality of pixels PX connected to the plurality of data lines DL and the plurality of gate lines GL. The display panel 110 includes a display area defined by a plurality of pixels PX and a non-display area in which various signal lines or pads are formed. The display panel 110 can be implemented by a display panel 110 used in various display devices such as a liquid crystal display device, an organic light emitting display device, or an electrophoretic display device. Hereinafter, it is described that the display panel 110 is a panel used in the organic light emitting display device, but is not limited thereto.

The timing controller 140 receives timing signals such as a vertical synchronization signal, a horizontal synchronization signal, a data enable signal, or a dot clock through a receiving circuit such as an LVDS or TMDS interface connected to a host system. The timing controller 140 generates timing control signals based on the input timing signal to control the data driver 130 and the gate driver 120.

The data driver 130 supplies a data voltage DATA to the plurality of sub pixels SP. The data driver 130 can include a plurality of source drive ICs (integrated circuits). The plurality of source drive ICs can be supplied with digital video data and a source timing control signal from the timing controller 140. The plurality of source drive ICs converts digital video data into a gamma voltage in response to the source timing control signal to generate a data voltage DATA and supply the data voltage DATA through the data line DL of the display panel 110. The plurality of source drive ICs can be connected to the data line DL of the display panel 110 by a chip on glass COG process or a tape automated bonding (TAB) process. Further, the source drive ICs are formed on the display panel 110 or are formed on a separate PCB substrate to be connected to the display panel 110.

The gate driver 120 supplies a gate signal to the plurality of sub pixels SP. The gate driver 120 can include a level shifter and a shift register. The level shifter shifts a level of a clock signal input at a transistor-transistor-logic TTL level from the timing controller 140 and then supplies the clock signal to the shift register. The shift register can be formed in the non-display area of the display panel 110, by a GIP manner, but is not limited thereto. The shift register can be configured by a plurality of stages which shifts the gate signal to output, in response to the clock signal and the driving signal. The plurality of stages included in the shift register can sequentially output the gate signal through a plurality of output ends.

The display panel 110 can include a plurality of sub pixels SP. The plurality of sub pixels SP can be sub pixels for emitting different color light. For example, the plurality of sub pixels SP can be a red sub pixel, a green sub pixel, a blue sub pixel, and a white sub pixel, but is not limited thereto. The plurality of sub pixels SP can configure a pixel PX. For example, the red sub pixel, the green sub pixel, the blue sub pixel, and the white sub pixel configure one pixel PX and the display panel 110 can include a plurality of pixels PX.

Hereinafter, a driving circuit for driving one sub pixel SP will be described in more detail with reference to FIG. 2 together.

Figure 2:
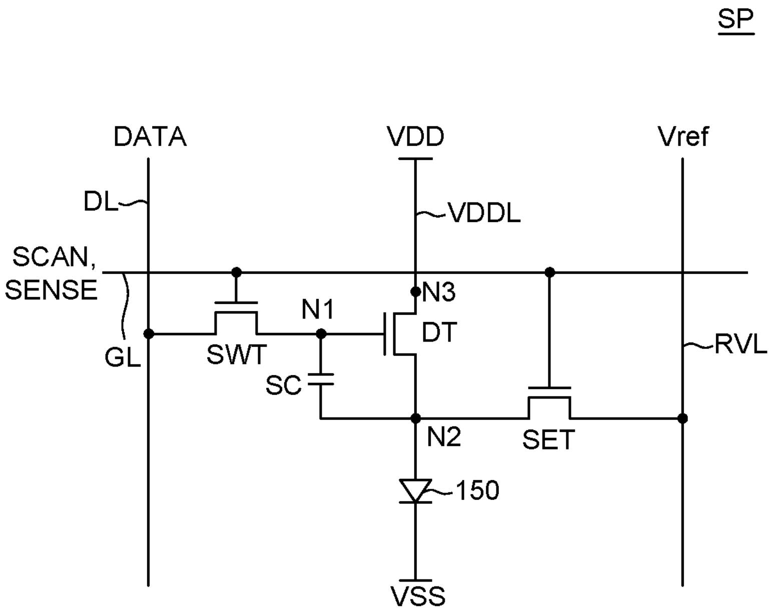
FIG. 2 is a circuit diagram of a sub pixel of a display device according to an exemplary embodiment of the present disclosure.

FIG. 2 is a circuit diagram of a sub pixel of a display device according to an exemplary embodiment of the present disclosure. In FIG. 2, a circuit diagram for one sub pixel SP among the plurality of sub pixels SP of the display device 100 is illustrated.

Referring to FIG. 2, the sub pixel SP can include a switching transistor SWT, a sensing transistor SET, a driving transistor DT, a storage capacitor SC, and a light emitting diode 150.

The light emitting diode 150 can include an anode, an organic layer, and a cathode. The organic layer can include various organic layers such as a hole injection layer, a hole transport layer, an organic light emitting layer, an electron transport layer, and an electron injection layer. The anode of the light emitting diode 150 can be connected to an output terminal of the driving transistor DT and a low potential voltage VSS is applied to the cathode. Even though in FIG. 2, it is described that the light emitting diode 150 is an organic light emitting diode 150, the present disclosure is not limited thereto so that as the light emitting diode 150, an inorganic light emitting diode, that is, an LED is also used.

The switching transistor SWT is a transistor which transmits the data voltage DATA to a first node N1 corresponding to a gate electrode of the driving transistor DT. The switching transistor SWT can include a drain electrode connected to the data line DL, a gate electrode connected to the gate line GL, and a source electrode connected to the gate electrode of the driving transistor DT. The switching transistor SWT is turned on by a gate voltage GATE applied from the gate line GL to transmit a data voltage DATA supplied from the data line DL to the first node N1 corresponding to the gate electrode of the driving transistor DT.

The driving transistor DT is a transistor which supplies a driving current to the light emitting diode 150 to drive the light emitting diode 150. The driving transistor DT can include a gate electrode corresponding to the first node N1, a source electrode corresponding to a second node N2 and an output terminal, and a drain electrode corresponding to a third node N3 and an input terminal. The gate electrode of the driving transistor DT can be connected to the switching transistor SWT, the drain electrode can be applied with a high potential voltage VDD by using a high potential voltage line VDDL, and the source electrode can be connected to the anode of the light emitting diode 150.

A storage capacitor SC is a capacitor which maintains a voltage corresponding to the data voltage DATA for one frame. One electrode of the storage capacitor SC can be connected to the first node N1 and the other electrode can be connected to the second node N2.

In the meantime, in the case of the display device 100, as the driving time of each sub pixel SP is increased, the circuit element such as the driving transistor DT can be degraded. Accordingly, a unique characteristic value of the circuit element such as a driving transistor DT can be changed. Here, the unique characteristic value of the circuit element can include a threshold voltage Vth of the driving transistor DT or a mobility a of the driving transistor DT. The change in the characteristic value of the circuit element can cause a luminance change of the corresponding sub pixel SP. Accordingly, the change in the characteristic value of the circuit element can be used as the same concept as the luminance change of the sub pixel SP.

Further, the degree of the change in the characteristic values between circuit elements of each sub pixel SP can vary depending on a degree of degradation of each circuit element. Such a difference in the changed degree of the characteristic values between the circuit elements can cause a luminance deviation between the sub pixels SP. Accordingly, the characteristic value deviation between circuit elements can be used as the same concept as the luminance deviation between the sub pixels SP. The change in the characteristic values of the circuit elements, that is, the luminance change of the sub pixel SP and the characteristic value deviation between the circuit elements, that is, the luminance deviation between the sub pixels SP may cause issues such as the lowering of the accuracy for luminance expressiveness of the sub pixel SP or an erroneous screen.

Therefore, the sub pixel SP of the display device 100 according to the exemplary embodiment of the present disclosure can provide a sensing function of sensing a characteristic value for the sub pixel SP and a compensating function of compensating for the characteristic value of the sub pixel SP using the sensing result.

Therefore, as illustrated in FIG. 2, the sub pixel SP can further include a sensing transistor SET to effectively control a voltage state of the source electrode of the driving transistor DT, in addition to the switching transistor SWT, the driving transistor DT, the storage capacitor SC, and the light emitting diode 150.

Referring to FIG. 2, the sensing transistor SET is connected between the source electrode of the driving transistor DT and the reference voltage line RVL which supplies a reference voltage Vref and a gate electrode is connected to the gate line GL. Therefore, the sensing transistor SET is turned on by the sensing signal SENSE applied through the gate line GL to apply the reference voltage Vref which is supplied through the reference voltage line RVL to the source electrode of the driving transistor DT. Further, the sensing transistor SET can be utilized as one of voltage sensing paths for the source electrode of the driving transistor DT.

Referring to FIG. 2, the switching transistor SWT and the sensing transistor SET of the sub pixel SP can share one gate line GL. That is, the switching transistor SWT and the sensing transistor SET are connected to the same gate line GL to be applied with the same gate signal. However, for the convenience of description, a voltage which is applied to the gate electrode of the switching transistor SWT is referred to as a gate voltage GATE and a voltage which is applied to the gate electrode of the sensing transistor SET is referred to as a sensing signal SENSE. However, the gate voltage GATE and the sensing signal SENSE applied to one sub pixel SP are the same signals which are transmitted from the same gate line GL.

However, the present disclosure is not limited thereto so that only the switching transistor SWT can be connected to the gate line GL, and the sensing transistor SET can be connected to a separate sensing line. Therefore, the gate voltage GATE can be applied to the switching transistor SWT through the gate line GL and the sensing signal SENSE can be applied to the sensing transistor SET through the sensing line.

Accordingly, the reference voltage Vref is applied to the source electrode of the driving transistor DT by using the sensing transistor SET. Further, a voltage for sensing the threshold voltage Vth of the driving transistor DT or the mobility a of the driving transistor DT is detected by the reference voltage line RVL. Further, the data driver 120 can compensate for the data voltage DATA in accordance with a variation of the threshold voltage Vth of the driving transistor DT or the mobility a of the driving transistor DT.

Hereinafter, a placement relationship of the plurality of sub pixels will be described with reference to FIG. 3.

Figure 3:
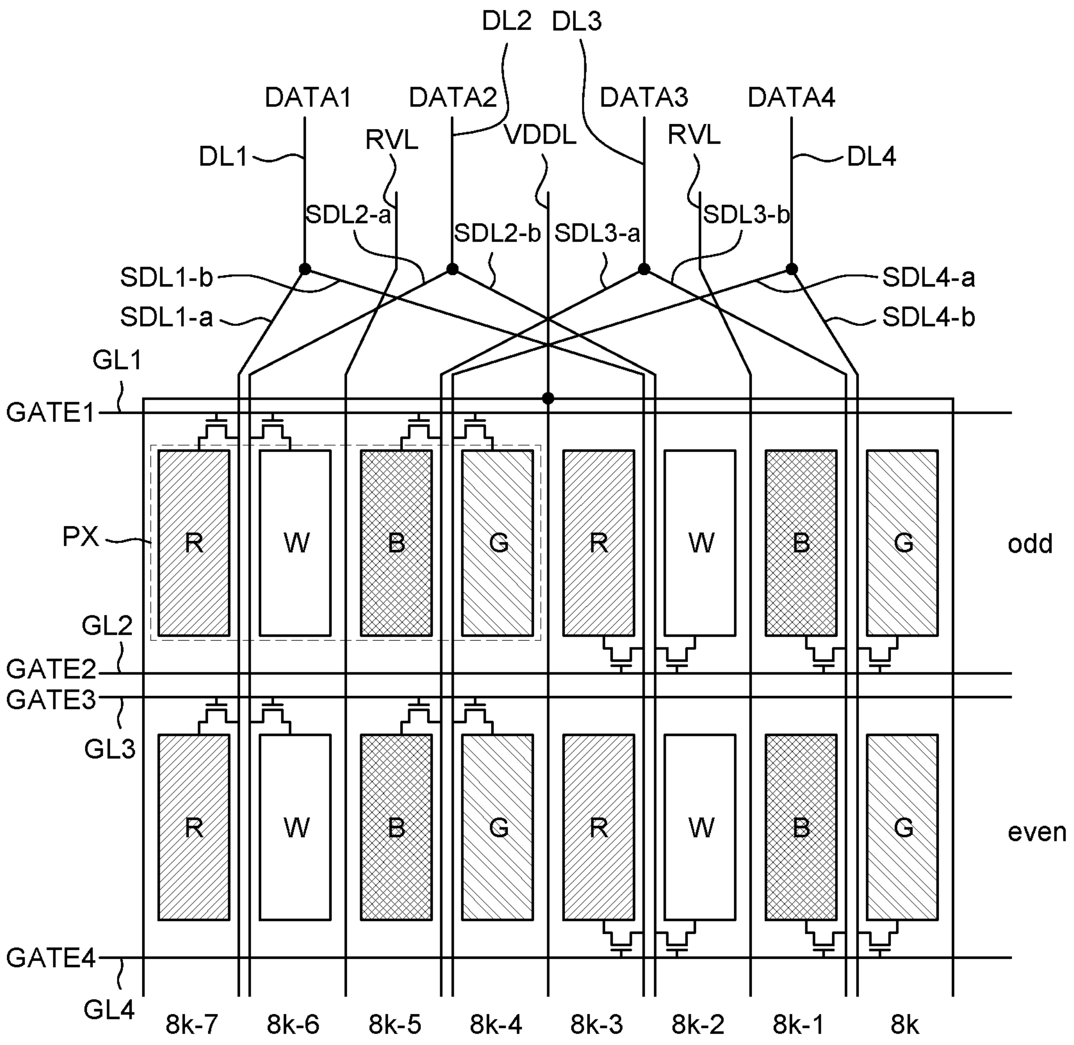
FIG. 3 is a block diagram for explaining a placement relationship of sub pixels of a display device according to an exemplary embodiment of the present disclosure.

FIG. 3 is a block diagram for explaining a placement relationship of sub pixels of a display device according to an exemplary embodiment of the present disclosure.

In FIG. 3, for the convenience of description, only four pixels PX which are disposed in a 2×2 matrix are illustrated and in the display area, the placement relationship of four pixels PX disposed in a 2×2 matrix is repeated. Further, the transistor disposed between the sub pixels R (red), G (green), B (blue), W (white) and the data line refers to the switching transistor SWT described with reference to FIG. 2.

Referring to FIG. 3, one pixel PX includes four sub pixels R, G, B, W. For example, as illustrated in FIG. 3, the pixel PX can include a first sub pixel R, a second sub pixel W, a third sub pixel B, and a fourth sub pixel G. Further, the first sub pixel R is a red sub pixel, the second sub pixel W is a white sub pixel, the third sub pixel B is a blue sub pixel, and the fourth sub pixel G is a green sub pixel. However, the present disclosure is not limited thereto and the plurality of sub pixels can be changed to various colors such as magenta, yellow, and cyan.

The plurality of same color sub pixels R, G, B, W can be disposed in a same column. For example, a plurality of first sub pixels R is disposed in one same column, a plurality of second sub pixels W is disposed in another same column, a plurality of third sub pixels B is disposed in another same column, and a plurality of fourth sub pixels G is disposed in another same column.

To be more specific, as illustrated in FIG. 3, the plurality of first sub pixels R is disposed in an 8 k-7-th column and an 8 k-3rd column, and the plurality of second sub pixels W is disposed in an 8 k-6-th column and an 8 k-2nd column. Further, the plurality of third sub pixels B is disposed in an 8 k-5-th column and an 8 k-1st column, and the plurality of fourth sub pixels G is disposed in an 8 k-4-th column and an 8 k-th column. Here, k refers to a natural number of 1 or larger.

For example, the first sub pixels R, the second sub pixels W, the third sub pixels B, and the fourth sub pixels G are sequentially repeated with respect to one odd-numbered row or one even-numbered row.

A plurality of data lines DL1, DL2, DL3, DL4 can be divided into a plurality of sub data lines SDL1-*a*, SDL1-*b*, SDL2-*a*, SDL2-*b*, SDL3-*a*, SDL3-*b*, SDL4-*a*, SDL4-*b*, respectively. Specifically, the first data line DL1 can be divided into a plurality of first sub data lines SDL1-*a* and SDL1-*b*, and the second data line DL2 can be divided into a plurality of second sub data lines SDL2-*a* and SDL2-*b*.

Further, the third data line DL3 can be divided into a plurality of third sub data lines SDL3-*a* and SDL3-*b*, and the fourth data line DL4 can be divided into a plurality of fourth sub data lines SDL4-*a* and SDL4-*b*.

As described above, the first sub data lines SDL1-*a* and SDL1-*b* can include a 1-a-th sub data line SDL1-*a* and a 1-b-th sub data line SDL1-*b*, and the second sub data lines SDL2-*a* and SD2L-b can include a 2-a-th sub data line SDL2-*a* and a 2-b-th sub data line SDL2-*b*. Further, the third sub data lines SDL3-*a* and SDL3-*b* can include a 3-a-th sub data line SDL3-*a* and a 3-b-th sub data line SDL3-*b*, and the fourth sub data lines SDL4-*a* and SDL4-*b* can include a 4-a-th sub data line SDL4-*a* and a 4-b-th sub data line SDL4-*b*.

The plurality of first sub data lines SDL1-*a* and SDL1-*b* is disposed to be adjacent to the plurality of first sub pixels R to be connected to the plurality of first sub pixels R.

Specifically, the 1-a-th sub data line SDL1-*a* is disposed between the plurality of first sub pixels R disposed in the 8 k-7-th column and the plurality of second sub pixels W disposed in the 8 k-6-th column to be electrically connected to the plurality of first sub pixels R disposed in the 8 k-7-th column. Specifically, the other one of the plurality of 1-b-th sub data lines SDL1-*b* is disposed between the plurality of first sub pixels R disposed in the 8 k-3rd column and the plurality of second sub pixels W disposed in the 8 k-2-th column to be electrically connected to the plurality of first sub pixels R disposed in the 8 k-3rd column.

The plurality of second sub data lines SDL2-*a* and SDL2-*b* is disposed to be adjacent to the plurality of second sub pixels W to be connected to the plurality of second sub pixels W.

Specifically, the 2-a-th sub data line SDL2-*a* is disposed between the plurality of first sub pixels R disposed in the 8 k-7-th column and the plurality of second sub pixels W disposed in the 8 k-6-th column to be electrically connected to the plurality of second sub pixels W disposed in the 8 k-6-th column. Specifically, the other one of the plurality of 2-b-th sub data lines SDL2-*b* is disposed between the plurality of first sub pixels R disposed in the 8 k-3rd column and the plurality of second sub pixels W disposed in the 8 k-2nd column to be electrically connected to the plurality of second sub pixels W disposed in the 8 k-2nd column.

The plurality of third sub data lines SDL3-*a* and SDL3-*b* is disposed to be adjacent to the plurality of third sub pixels B to be connected to the plurality of third sub pixels B.

Specifically, the 3-a-th sub data line SDL3-*a* is disposed between the plurality of third sub pixels B disposed in the 8 k-5-th column and the plurality of fourth sub pixels G disposed in the 8 k-4-th column to be electrically connected to the plurality of third sub pixels B disposed in the 8 k-5-th column. The 3-b-th sub data line SDL3-*b* is disposed between the plurality of third sub pixels B disposed in the 8 k-1st column and the plurality of fourth sub pixels G disposed in the 8 k-th column to be electrically connected to the plurality of third sub pixels B disposed in the 8 k-1st column.

The plurality of fourth sub data lines SDL4-*a* and SDL4-*b* is disposed to be adjacent to the plurality of fourth sub pixels G to be connected to the plurality of fourth sub pixels G.

Specifically, the 4-a-th sub data line SDL4-*a* is disposed between the plurality of third sub pixels B disposed in the 8 k-5-th column and the plurality of fourth sub pixels G disposed in the 8 k-4-th column to be electrically connected to the plurality of fourth sub pixels G disposed in the 8 k-4-th column. Specifically, the other one of the plurality of 4-b-th sub data lines SDL4-*b* is disposed between the plurality of third sub pixels B disposed in the 8 k-1st column and the plurality of fourth sub pixels G disposed in the 8 k-th column to be electrically connected to the plurality of fourth sub pixels G disposed in the 8 k-th column.

A first data voltage DATA1 which is a red data voltage can be applied to the first data line DL1 and a second data voltage DATA2 which is a white data voltage can be applied to the second data line DL2. Further, a third data voltage DATA3 which is a blue data voltage can be applied to the third data line DL3 and a fourth data voltage DATA4 which is a green data voltage can be applied to the fourth data line DL4.

Therefore, the first data voltage DATA1 which is a red data voltage can be applied to the plurality of first sub data lines SDL1-*a* and SDL1-*b* and the second data voltage DATA2 which is a white data voltage can be applied to the plurality of second sub data line SDL2-*a* and SDL2-*b*. Further, the third data voltage DATA3 which is a blue data voltage can be applied to the plurality of third sub data lines SDL3-*a* and SDL3-*b* and the fourth data voltage DATA4 which is a green data voltage can be applied to the plurality of fourth sub data lines SDL4-*a* and SDL4-*b*.

Each of the plurality of gate lines GL1 to GL4 can be disposed on both sides of the plurality of sub pixels R, G, B, W, and two gate lines GL2 and GL3 can be disposed between the plurality of sub pixels R, G, B, and W.

Specifically, referring to FIG. 3, the first gate line GL1 and the second gate line GL2 are disposed on both sides of the plurality of sub pixels R, G, B, W in the odd-numbered rows, and the third gate line GL3 and the fourth gate line GL4 are disposed on both sides of the plurality of sub pixels R, G, B, W in the even-numbered rows. Therefore, the second gate line GL2 and the third gate line GL3 can be disposed between the plurality of sub pixels R, G, B, W in the odd-numbered rows and the plurality of sub pixels R, G, B, W in the even-numbered rows.

In the meantime, each of the plurality of pixels PX can be connected to the same gate lines GL1 to GL4 and adjacent pixels PX among the plurality of pixels PX can be connected to different gate lines GL1 to GL4.

Specifically, referring to FIG. 3, the sub pixels R, W, B, G disposed in the 8 k-7-th column to 8 k-4-th column of the odd-numbered row are connected to the first gate line GL1. The sub pixels R, W, B, G disposed in the 8 k-3rd column to 8 k-th column of the odd-numbered row are connected to the second gate line GL2. The sub pixels R, W, B, G disposed in the 8 k-7-th column to 8 k-4-th column of the even-numbered row are connected to the third gate line GL3. The sub pixels R, W, B, G disposed in the 8 k-3rd column to 8 k-th column of the even-numbered row are connected to the fourth gate line GL4.

Each of the plurality of reference voltage lines RVL can be disposed in one pixel PX and each of the plurality of high potential voltage lines VDDL can be disposed between the plurality of adjacent pixels PX.

Specifically, the plurality of reference voltage lines RVL is disposed between the plurality of second sub pixels W disposed in the 8 k-6-th column and the plurality of third sub pixels B disposed in the 8 k-5-th column and disposed between the plurality of second sub pixels W disposed in the 8 k-2rd column and the plurality of third sub pixels B disposed in the 8 k-1st column. However, the reference voltage lines RVL might be also disposed between other ones of the sub pixels.

The plurality of high potential voltage lines VDDL can be disposed between the plurality of fourth sub pixels G disposed in the 8 k-4-th column and the plurality of first sub pixels R disposed in the 8 k-3rd column and disposed at the outside of the plurality of first sub pixels R disposed in the 8 k-7-th column and at the outside of the plurality of fourth sub pixels G disposed in the 8 k-th column. However, the high potential voltage lines VDDL might be also disposed between other ones of the sub pixels.

Hereinafter, a single color freeze frame driving method and a vertical pattern screen driving method of a display device 100 according to an exemplary embodiment of the present disclosure will be described with reference to FIGS. 4 and 5.

Figure 4:
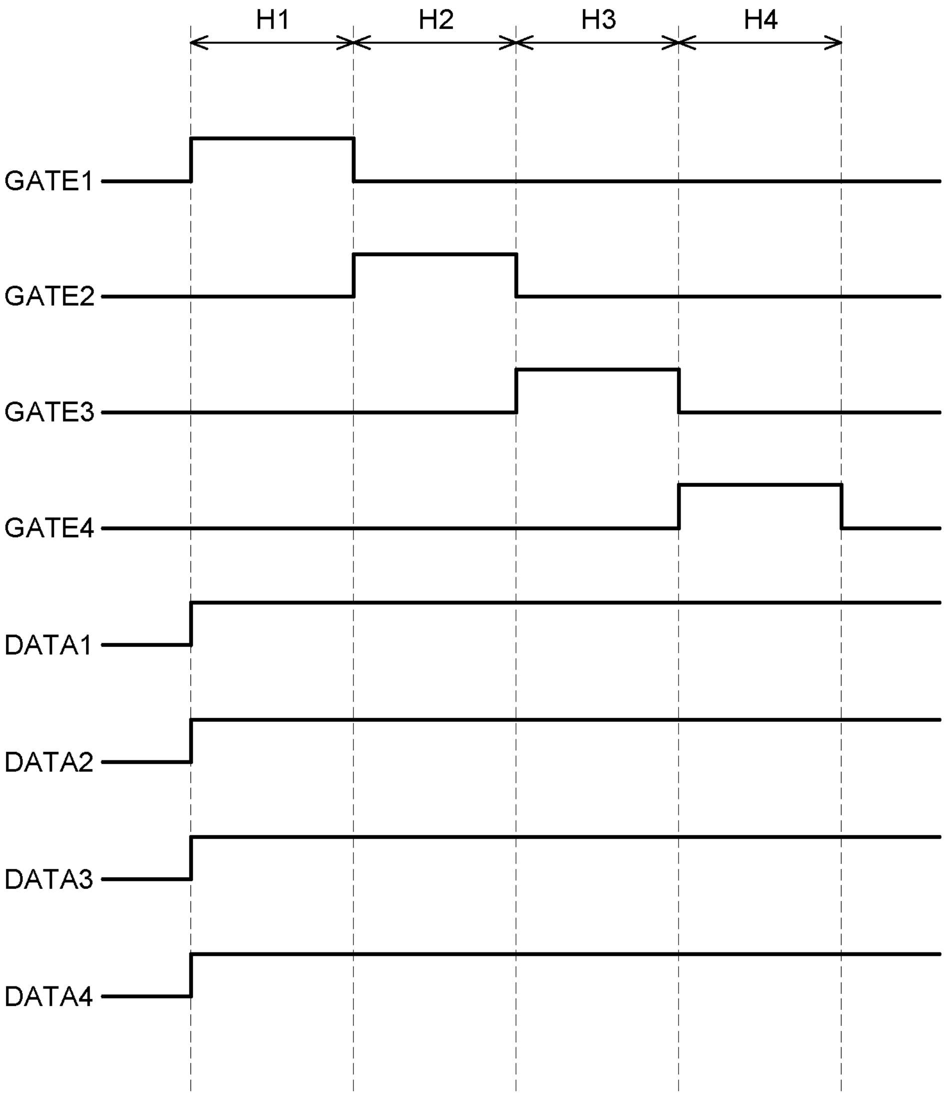
FIG. 4 is a timing chart of a gate voltage and a data voltage when a display device according to an exemplary embodiment of the present disclosure implements a freeze frame with a single color.

FIG. 4 is a timing chart of a gate voltage and a data voltage when a display device according to an exemplary embodiment of the present disclosure implements a freeze frame with a single color.

Referring to FIGS. 3 and 4, a first gate voltage GATE1 is output through the first gate line GL1, a second gate voltage GATE2 is output through the second gate line GL2, a third gate voltage GATE3 is output through the third gate line GL3, and a fourth gate voltage GATE4 is output through the fourth gate line GL4.

The first data voltage DATA1 is output through the first data line DL1, the second data voltage DATA2 is output through the second data line DL2, the third data voltage DATA3 is output through the third data line DL3, and the fourth data voltage DATA4 is output through the fourth data line DL4.

Referring to FIG. 4, during a first horizontal period H1, the first gate voltage GATE1 is a gate high voltage and the second gate voltage GATE2, the third gate voltage GATE3, and the fourth gate voltage GATE4 are gate low voltages. Further, during the first horizontal period H1, the first data voltage DATA1 to fourth data voltage DATA4 can be a predetermined level of data voltage to implement a predetermined gray scale.

Accordingly, during the first horizontal period H1, all the switching transistors connected to the plurality of first sub pixels R disposed in the 8 k-7-th column, the plurality of second sub pixels W disposed in the 8 k-6-th column, the plurality of third sub pixels B disposed in the 8 k-5-th column, and the plurality of fourth sub pixels G disposed in the 8 k-4-th column in the odd-numbered row are turned on.

Therefore, during the first horizontal period H1, in the odd-numbered row, the first data voltage DATA1 can be charged in the plurality of first sub pixels R disposed in the 8 k-7-th column and the second data voltage DATA2 can be charged in the plurality of second sub pixels W disposed in the 8 k-6-th column. Further, the third data voltage DATA3 can be charged in the plurality of third sub pixels B disposed in the 8 k-5-th column and the fourth data voltage DATA4 can be charged in the plurality of fourth sub pixels G disposed in the 8 k-4-th column.

During a second horizontal period H2, the second gate voltage GATE2 is a gate high voltage and the first gate voltage GATE1, the third gate voltage GATE3, and the fourth gate voltage GATE4 are gate low voltages. Further, also during the second horizontal period H2, the first data voltage DATA1 to fourth data voltage DATA4 can be a predetermined level of data voltage to implement a predetermined gray scale.

Accordingly, during the second horizontal period H2, all the switching transistors connected to the plurality of first sub pixels R disposed in the 8 k-3rd column, the plurality of second sub pixels W disposed in the 8 k-2nd column, the plurality of third sub pixels B disposed in the 8 k-1st column, and the plurality of fourth sub pixels G disposed in the 8 k-th column in the odd-numbered row are turned on.

Therefore, during the second horizontal period H2, in the odd-numbered row, the first data voltage DATA1 can be charged in the plurality of first sub pixels R disposed in the 8 k-3rd column and the second data voltage DATA2 can be charged in the plurality of second sub pixels W disposed in the 8 k-2nd column. Further, the third data voltage DATA3 can be charged in the plurality of third sub pixels B disposed in the 8 k-1st column and the fourth data voltage DATA4 can be charged in the plurality of fourth sub pixels G disposed in the 8 k-th column.

During the third horizontal period H3, the third gate voltage GATE3 is a gate high voltage and the first gate voltage GATE1, the second gate voltage GATE2, and the fourth gate voltage GATE4 are gate low voltages. Further, also during the third horizontal period H3, the first data voltage DATA1 to fourth data voltage DATA4 can be a predetermined level of data voltage to implement a predetermined gray scale.

Accordingly, during the third horizontal period H3, all the switching transistors connected to the plurality of first sub pixels R disposed in the 8 k-7-th column, the plurality of second sub pixels W disposed in the 8 k-6-th column, the plurality of third sub pixels B disposed in the 8 k-5-th column, and the plurality of fourth sub pixels G disposed in the 8 k-4-th column in the even-numbered row are turned on.

Therefore, during the third horizontal period H3, in the even-numbered row, the first data voltage DATA1 can be charged in the plurality of first sub pixels R disposed in the 8 k-7-th column and the second data voltage DATA2 can be charged in the plurality of second sub pixels W disposed in the 8 k-6-th column. Further, the third data voltage DATA3 can be charged in the plurality of third sub pixels B disposed in the 8 k-5-th column and the fourth data voltage DATA4 can be charged in the plurality of fourth sub pixels G disposed in the 8 k-4-th column.

In the fourth horizontal period H4, the fourth gate voltage GATE4 is a gate high voltage and the first gate voltage GATE1, the second gate voltage GATE2, and the third gate voltage GATE3 are gate low voltages. Further, also during the fourth horizontal period H4, the first data voltage DATA1 to fourth data voltage DATA4 can be a predetermined level of data voltage to implement a predetermined gray scale.

Accordingly, during the fourth horizontal period H4, all the switching transistors connected to the plurality of first sub pixels R disposed in the 8 k-3rd column, the plurality of second sub pixels W disposed in the 8 k-2nd column, the plurality of third sub pixels B disposed in the 8 k-1st column, and the plurality of fourth sub pixels G disposed in the 8 k-th column in the even-numbered row are turned on.

Therefore, during the fourth horizontal period H4, in the even-numbered row, the first data voltage DATA1 can be charged in the plurality of first sub pixels R disposed in the 8 k-3rd column and the second data voltage DATA2 can be charged in the plurality of second sub pixels W disposed in the 8 k-2nd column. Further, the third data voltage DATA3 can be charged in the plurality of third sub pixels B disposed in the 8 k-1st column and the fourth data voltage DATA4 can be charged in the plurality of fourth sub pixels G disposed in the 8 k-th column.

As described above, when the display device 100 according to the exemplary embodiment of the present disclosure implements a single color freeze frame, during the first to fourth horizontal periods H1 to H4, that is, during one frame, the first to fourth data voltages DATA1 to DATA4 can be the same level. Accordingly, during one frame, the data transition of the first to fourth data voltages DATA1 to DATA4 does not occur.

Figure 5:
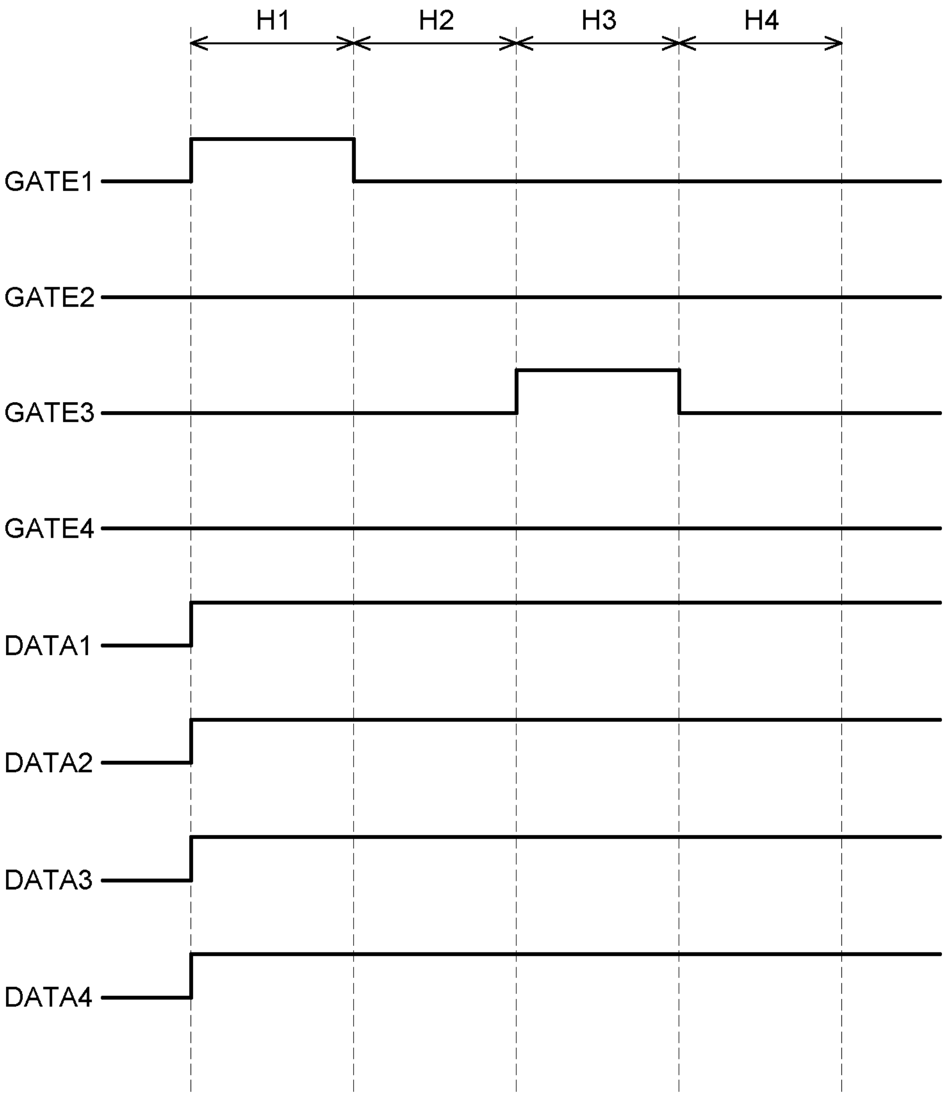
FIG. 5 is a timing chart of a gate voltage and a data voltage when a display device according to an exemplary embodiment of the present disclosure implements a vertical pattern screen.

FIG. 5 is a timing chart of a gate voltage and a data voltage when a display device according to an exemplary embodiment of the present disclosure implements a vertical pattern screen.

Referring to FIG. 5, during a first horizontal period H1, the first gate voltage GATE1 is a gate high voltage and a second gate voltage GATE2, a third gate voltage GATE3, and a fourth gate voltage GATE4 are gate low voltages. Further, during the first horizontal period H1, the first data voltage DATA1 to fourth data voltage DATA4 can be a predetermined level of data voltage to implement a predetermined gray scale.

Accordingly, during the first horizontal period H1, all the switching transistors connected to the plurality of first sub pixels R disposed in the 8 k-7-th column, the plurality of second sub pixels W disposed in the 8 k-6-th column, the plurality of third sub pixels B disposed in the 8 k-5-th column, and the plurality of fourth sub pixels G disposed in the 8 k-4-th column in the odd-numbered row are turned on.

Therefore, during the first horizontal period H1, in the odd-numbered row, the first data voltage DATA1 can be charged in the plurality of first sub pixels R disposed in the 8 k-7-th column and the second data voltage DATA2 can be charged in the plurality of second sub pixels W disposed in the 8 k-6-th column. Further, the third data voltage DATA3 is charged in the plurality of third sub pixels B disposed in the 8 k-5-th column and the fourth data voltage DATA4 can be charged in the plurality of fourth sub pixels G disposed in the 8 k-4-th column.

During a second horizontal period H2, all the first gate voltage GATE1, the second gate voltage GATE2, the third gate voltage GATE3, and the fourth gate voltage GATE4 are gate low voltages. Further, also during the second horizontal period H2, the first data voltage DATA1 to fourth data voltage DATA4 can be a predetermined level of data voltage to implement a predetermined gray scale.

Therefore, during the second horizontal period H2, all the switching transistors connected to all the sub pixels are turned off. Therefore, during the second horizontal period H2, in the odd-numbered row, the first data voltage DATA1 is not charged in the plurality of first sub pixels R disposed in the 8 k-3rd column and the second data voltage DATA2 is not charged in the plurality of second sub pixels W disposed in the 8 k-2nd column. Further, the third data voltage DATA3 is not charged in the plurality of third sub pixels B disposed in the 8 k-1st column and the fourth data voltage DATA4 is not charged in the plurality of fourth sub pixels G disposed in the 8 k-th column.

During the third horizontal period H3, the third gate voltage GATE3 is a gate high voltage and the first gate voltage GATE1, the second gate voltage GATE2, and the fourth gate voltage GATE4 are gate low voltages. Further, also during the third horizontal period H3, the first data voltage DATA1 to fourth data voltage DATA4 can be a predetermined level of data voltage to implement a predetermined gray scale.

Accordingly, during the third horizontal period H3, all the switching transistors connected to the plurality of first sub pixels R disposed in the 8 k-7-th column, the plurality of second sub pixels W disposed in the 8 k-6-th column, the plurality of third sub pixels B disposed in the 8 k-5-th column, and the plurality of fourth sub pixels G disposed in the 8 k-4-th column in the even-numbered row are turned on.

Therefore, during the third horizontal period H3, in the even-numbered row, the first data voltage DATA1 can be charged in the plurality of first sub pixels R disposed in the 8 k-7-th column and the second data voltage DATA2 can be charged in the plurality of second sub pixels W disposed in the 8 k-6-th column. Further, the third data voltage DATA3 can be charged in the plurality of third sub pixels B disposed in the 8 k-5-th column and the fourth data voltage DATA4 can be charged in the plurality of fourth sub pixels G disposed in the 8 k-4-th column.

During a fourth horizontal period H4, all the first gate voltage GATE1, the second gate voltage GATE2, the third gate voltage GATE3, and the fourth gate voltage GATE4 are gate low voltages. Further, also during the fourth horizontal period H4, the first data voltage DATA1 to fourth data voltage DATA4 can be a predetermined level of data voltage to implement a predetermined gray scale.

Therefore, during the fourth horizontal period H4, all the switching transistors connected to all the sub pixels are turned off. Therefore, during the fourth horizontal period H4, in the even-numbered row, the first data voltage DATA1 may not be charged in the plurality of first sub pixels R disposed in the 8 k-3rd column and the second data voltage DATA2 may not be charged in the plurality of second sub pixels W disposed in the 8 k-2nd column. Further, the third data voltage DATA3 may not be charged in the plurality of third sub pixels B disposed in the 8 k-1st column and the fourth data voltage DATA4 may not be charged in the plurality of fourth sub pixels G disposed in the 8 k-th column.

As described above, when the display device 100 according to the exemplary embodiment of the present disclosure implements a vertical pattern screen, during the first to fourth horizontal periods H1 to H4, that is, during one frame, the first to fourth data voltages DATA1 to DATA4 can be the same level. Accordingly, during one frame, the data transition of the first to fourth data voltages DATA1 to DATA4 does not occur.

In the display device of the related art, two sub pixels having different colors are connected to one data line. Therefore, in the display device of the related art, a data voltage to be applied to the data line needs to be a data voltage corresponding to the plurality of colors so that the data transition of the data voltage is essential. For example, even during one horizontal period, the data transition of the data voltage can occur and in at least one frame, the data transition of the data voltage needs to occur.

Therefore, when the data transition of the data voltage frequently occurs, there can be an issue in that the data voltage is not fully charged during one horizontal period. Further, when the data transition of the data voltage frequently occurs, there can be an issue in that the data driver configured to supply a data voltage can be seriously heated.

In contrast, in the display device according to the exemplary embodiment of the present disclosure, each of the plurality of data lines DL1, DL2, DL3, and DL4 is divided into a plurality of sub data lines SDL1-*a*, SDL1-*b*, SDL2-*a*, SDL2-*b*, SDL3-*a*, SDL3-*b*, SDL4-*a*, SDL4-*b*. Further, the plurality of divided sub data lines SDL1-*a*, SDL1-*b*, SDL2-*a*, SDL2-*b*, SDL3-*a*, SDL3-*b*, SDL4-*a*, SDL4-*b* can be connected to sub pixels R, G, B, W which implement the same color. Accordingly, in the display device according to the exemplary embodiment of the present disclosure, the plurality of data lines can output only a data voltage corresponding to one color. Therefore, when a single color freeze frame or a vertical pattern screen is implemented, the data transition of the data voltage may not occur in one frame.

Therefore, the data voltage can be fully charged during one frame so that the incomplete charging issue of the data voltage of the display device of the related art can be solved. Further, the data voltage is constantly maintained for one frame so that the heating issue of the data driver configured to supply a data voltage can also be solved.

Moreover, when the display device implements a vertical pattern screen, the data transition of the data voltage does not occur in one frame so that a burden of the data driver when the vertical pattern screen is implemented can be minimized.

Hereinafter, a display device according to another exemplary embodiment of the present disclosure will be described. The difference of the display device according to another exemplary embodiment of the present disclosure is a MUX (MX, multiplexer), so that the MUX MX will be described in detail. Further, a repeated description between the display device according to another exemplary embodiment of the present disclosure and the display device according to the exemplary embodiment of the present disclosure will be omitted.

<Another Exemplary Embodiment of Present Disclosure-MUX Added>

Figure 6:
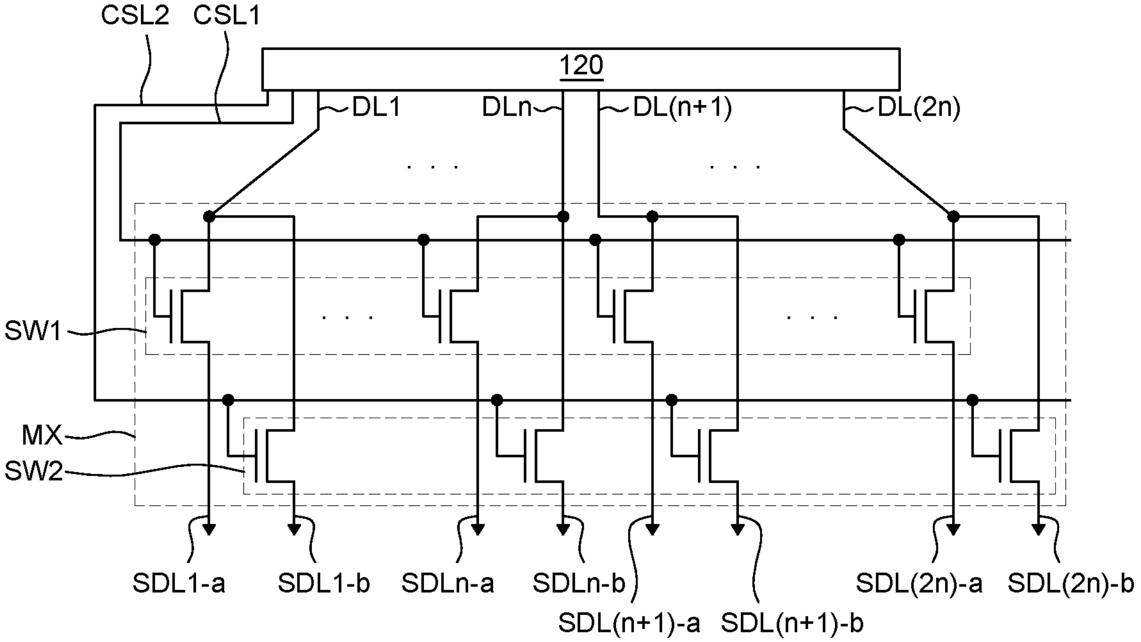
FIG. 6 is a circuit diagram for explaining a MUX of a display device according to another exemplary embodiment of the present disclosure.

FIG. 6 is a circuit diagram for explaining a MUX of a display device according to another exemplary embodiment of the present disclosure.

As illustrated in FIG. 6, a MUX MX is disposed between a plurality of data lines DL1 to DL(2*n*) and a plurality of sub data lines SDL1-*a* to SDL(2*n*)-b. Further, the MUX MX is connected to the plurality of data lines DL1 to DL(2*n*) and the plurality of sub data lines SDL1-*a* to SDL(2*n*)-b to determine a connection relationship of the plurality of data lines DL1 to DL(2*n*) and the plurality of sub data lines SDL1-*a* to SDL(2*n*)-b. n refers to a natural number of 1 or larger.

The MUX MX includes a plurality of first switching elements SW1 and a plurality of second switching element SW2. Each of the plurality of first switching elements SW1 connects the data line DLn to any one SDLn-a of the plurality of sub data lines in accordance with a first control signal. Further, each of the plurality of second switching elements SW2 connects the data line DLn to the other one SDLn-b of the plurality of sub data lines in accordance with a second control signal.

Specifically, the first switching element SW1 includes a gate electrode connected to a first control signal line CSL1, a drain electrode connected to an n-th data line DLn, and a source electrode connected to an n-a-th sub data line SDLn-a.

Therefore, when the first control signal applied to the first control signal line CSL1 is a high level, the first switching element SW1 is turned on so that the n-th data line DLn is electrically connected to the n-a-th sub data line SDLn-a. In contrast, when the first control signal applied to the first control signal line CSL1 is a low level, the first switching element SW1 is turned off so that the n-th data line DLn is electrically isolated from the n-a-th sub data line SDLn-a.

The second switching element SW2 includes a gate electrode connected to a second control signal line CSL2, a drain electrode connected to an n-th data line DLn, and a source electrode connected to an n-b-th sub data line SDLn-b.

Therefore, when the second control signal applied to the second control signal line CSL2 is a high level, the second switching element SW2 is turned on so that the n-th data line DLn is electrically connected to the n-b-th sub data line SDLn-b. In contrast, when the second control signal applied to the second control signal line CSL2 is a low level, the second switching element SW2 is turned off so that the n-th data line DLn is electrically isolated from the n-b-th sub data line SDLn-b.

Specifically, an operation of the above-described display device according to another exemplary embodiment of the present disclosure will be described below by associating with the plurality of sub pixels.

Figure 7:
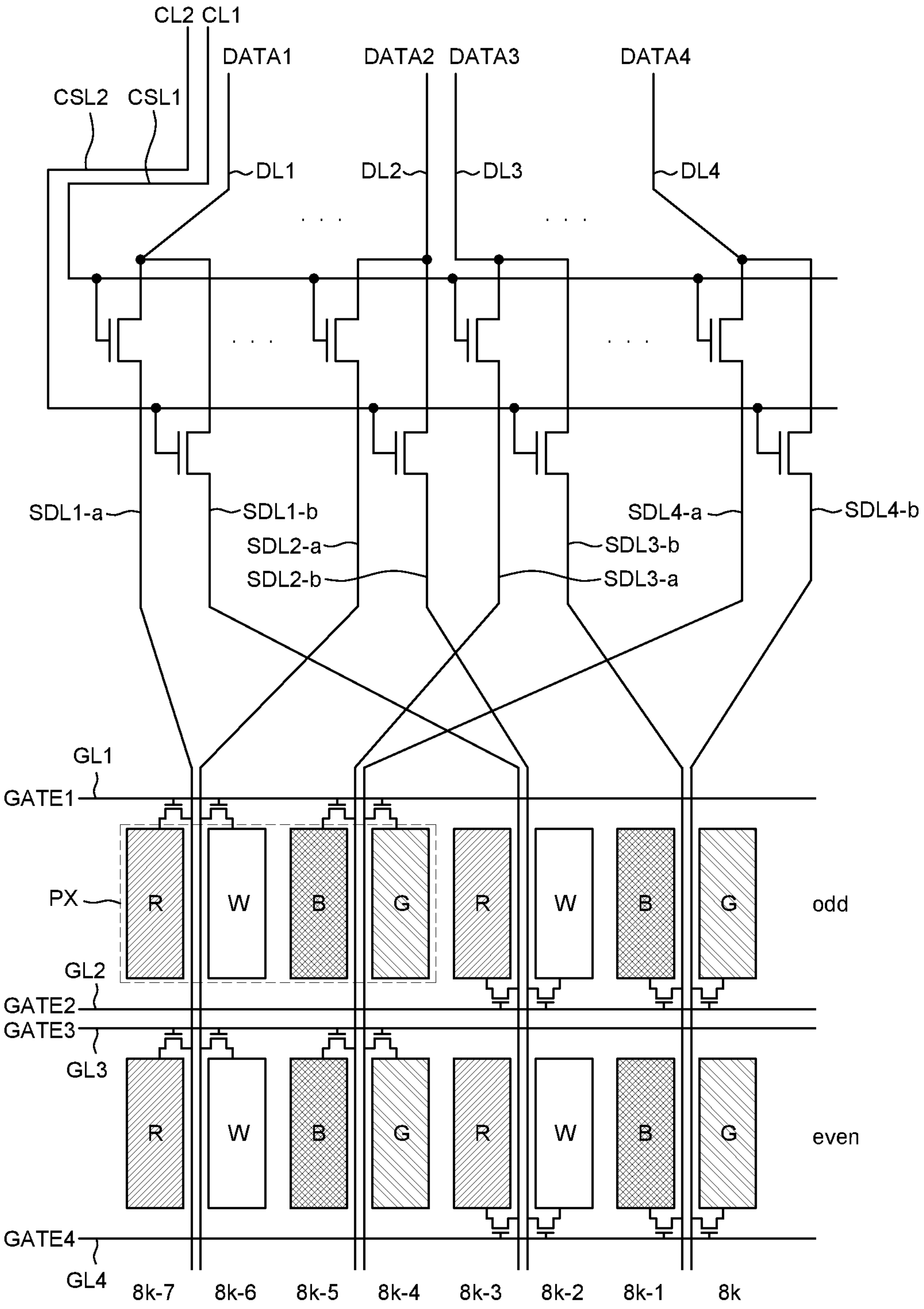
FIG. 7 is a circuit diagram for explaining a connection relationship of a MUX and a plurality of sub pixels of a display device according to another exemplary embodiment of the present disclosure.

FIG. 7 is a circuit diagram for explaining a connection relationship of a MUX and a plurality of sub pixels of a display device according to another exemplary embodiment of the present disclosure.

An operating method of the plurality of sub pixels connected to the first to fourth gate lines GL4 and the first to fourth data lines DL4 will be described with reference to FIG. 7. For example, the operating method of the plurality of sub pixels will be described by applying 2 to n of FIG. 6.

Referring to FIG. 7, when the first control signal CS1 is a high level and the second control signal CS2 is a low level, the plurality of first switching elements SW1 is turned on and the plurality of second switching elements SW2 is turned off. Therefore, by using the plurality of first switching elements SW1, the first data line DL1 and the 1-a-th sub data line SDL1-*a* are electrically connected, the second data line DL2 and the 2-a-th sub data line SDL2-*a* are electrically connected, the third data line DL3 and the 3-a-th sub data line SDL3-*a* are electrically connected, and the fourth data line DL4 and the 4-a-th sub data line SDL4-*a* are electrically connected.

Accordingly, the first data voltage DATA1 is charged in the plurality of first sub pixels R disposed in the 8 k-7-th column connected to the 1-a-th sub data line SDL1-*a* and the second data voltage DATA2 is charged in the plurality of second sub pixels W disposed in the 8 k-6-th column connected to the 2-a-th sub data line SDL2-*a*. Further, the third data voltage DATA3 is charged in the plurality of third sub pixels B disposed in the 8 k-5-th column connected to the 3-a-th sub data line SDL3-*a* and the fourth data voltage DATA4 is charged in the plurality of fourth sub pixels G disposed in the 8 k-4-th column connected to the 4-a-th sub data line SDL4-*a*.

When the first control signal CS1 is a low level and the second control signal CS2 is a high level, the plurality of first switching elements SW1 is turned off and the plurality of second switching elements SW2 is turned on. Therefore, by using the plurality of first switching elements SW1, the first data line DL1 and the 1-b-th sub data line SDL1-*b* are electrically connected, the second data line DL2 and the 2-b-th sub data line SDL2-*b* are electrically connected, the third data line DL3 and the 3-b-th sub data line SDL3-*b* are electrically connected, and the fourth data line DL4 and the 4-b-th sub data line SDL4-*b* are electrically connected.

Accordingly, the first data voltage DATA1 is charged in the plurality of first sub pixels R disposed in the 8 k-3rd column connected to the 1-b-th sub data line SDL1-*b* and the second data voltage DATA2 is charged in the plurality of second sub pixels W disposed in the 8 k-2nd column connected to the 2-b-th sub data line SDL2-*b*. Further, the third data voltage DATA3 is charged in the plurality of third sub pixels B disposed in the 8 k-1st column connected to the 3-b-th sub data line SDL3-*b* and the fourth data voltage DATA4 is charged in the plurality of fourth sub pixels G disposed in the 8 k-th column connected to the 4-b-th sub data line SDL4-*b*.

As described above, the first switching element SW1 and the second switching element SW2 of the MUX MX are alternately turned on so that the data voltage is applied to all the plurality of sub pixels R, G, B, and W to implement images in the display area.

As described above, the display device according to another exemplary embodiment of the present disclosure includes the MUX so that the data line is not connected all the plurality of sub data lines, but can be connected to some of the plurality of sub data lines.

Therefore, the data voltage applied to the data line is applied to not all the plurality of sub data lines, but some of the plurality of sub data lines.

Accordingly, a load which needs to be borne by the data driver of the display device according to another exemplary embodiment of the present disclosure to output a data voltage can be reduced. As a result, the data voltage of display device according to another exemplary embodiment of the present disclosure is fully charged in the plurality of sub pixels so that the image quality is improved.

Hereinafter, a display device according to still another exemplary embodiment of the present disclosure will be described. The difference of the display device according to still another exemplary embodiment of the present disclosure is division of MUX, so that the division of the MUX will be described in detail. Further, a repeated description between the display device according to another exemplary embodiment of the present disclosure and the display device the exemplary embodiment of the present disclosure will be omitted.

<Still Another Exemplary Embodiment (Example 3) of Present Disclosure-MUX Division>

Figure 8:
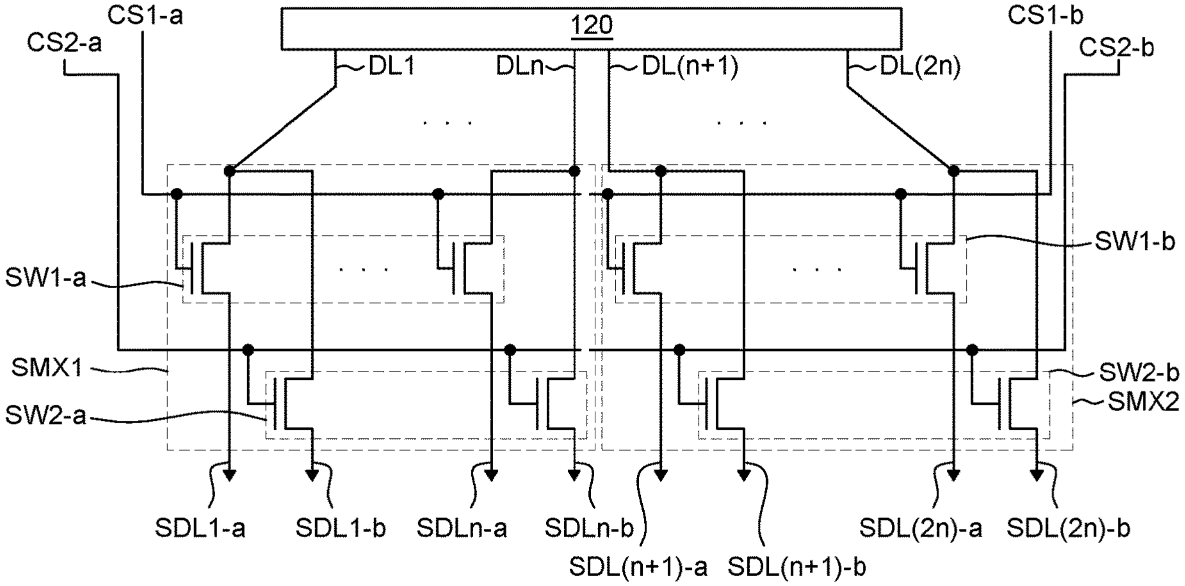
FIG. 8 is a circuit diagram for explaining two sub MUX of a display device according to still another exemplary embodiment of the present disclosure.
Figure 9:
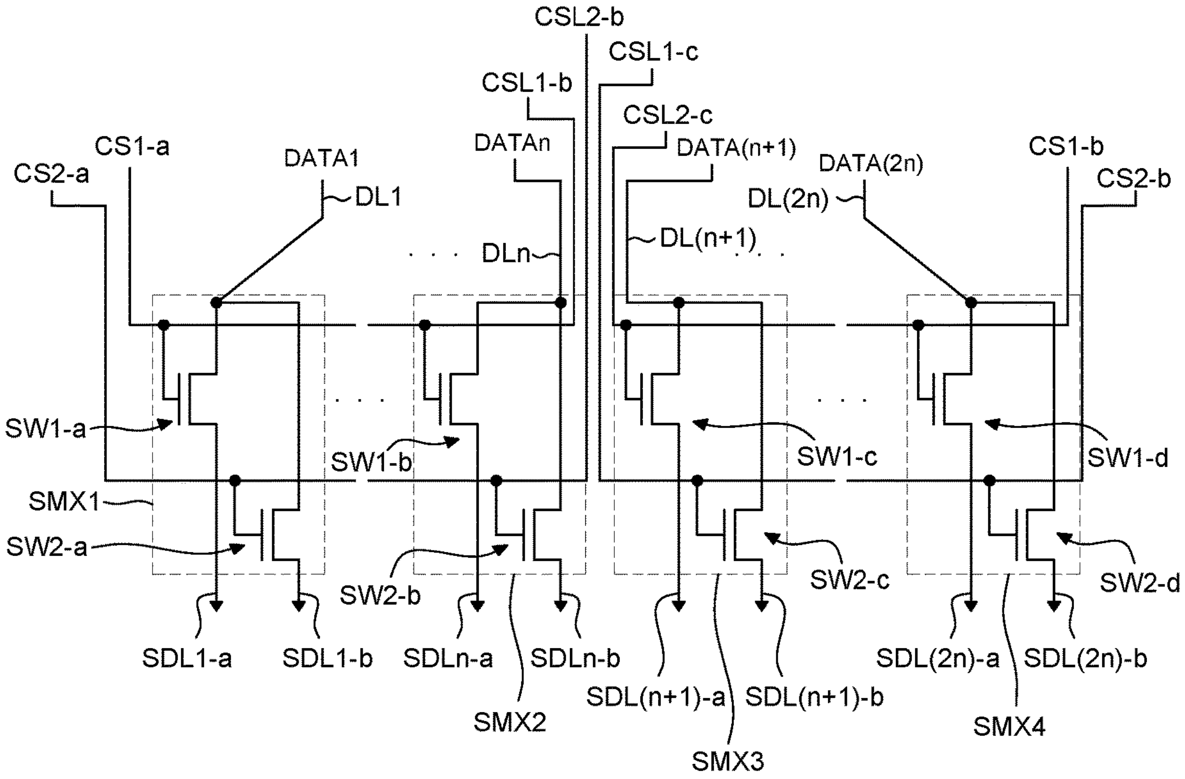
FIG. 9 is a circuit diagram for explaining four sub MUX of a display device according to still another exemplary embodiment of the present disclosure.

FIG. 8 is a circuit diagram for explaining two sub MUX of a display device according to still another exemplary embodiment (Example 3) of the present disclosure. FIG. 9 is a circuit diagram for explaining four sub MUX of a display device according to still another exemplary embodiment (Example 3) of the present disclosure.

Referring to FIG. 8, the MUX MX can be divided into a first sub MUX SMX1 and a second sub MUX SMX2.

The first sub MUX SMX1 is connected to a first data line to an n-th data line DL1 to DLn and a 1-a-th sub data line to an n-b-th sub data line SDL1-*a* to SDLn-b to determine a connection relationship of the first data line to the n-th data line DL1 to DLn and the 1-a-th sub data line to the n-b-th sub data line SDL1-*a* to SDLn-b.

The second sub MUX SMX2 can be connected to an n+1-th data line to a 2n-th data line DL(n+1) to DL(2*n*) and a (n+1)-a-th sub data line to a (2n)-b-th sub data line SDL(n+1)-*a* to SDL(2*n*)-b. Therefore, the second sub MUX SMX2 determines a connection relationship of the n+1-th data line to the 2n-th data line DL(n+1) to DL(2*n*) and the (n+1)-a-th sub data line to the (2n)-b-th sub data line SDL(n+1)-*a* to SDL(2*n*)-b.

The first sub MUX SMX1 includes a plurality of 1-a-th switching elements SW1-*a* and a plurality of 2-a-th switching elements SW2-*a*. Each of the plurality of 1-a-th switching elements SW1-*a* determines a connection relationship of the first data line to n-th data line DL1 to DLn and the 1-a-th sub data line to n-a-th sub data line SDL1-*a* to SDLn-a, in accordance with a 1-a-th control signal CS1-*a*. Each of the plurality of 2-a-th switching elements SW2-*a* determines a connection relationship of the first data line to n-th data line DL1 to DLn and the 1-b-th sub data line to n-b-th sub data line SDL1-*b* to SDLn-b, in accordance with a 2-a-th control signal CS2-*a*.

The second sub MUX SMX2 includes a plurality of 1-b-th switching elements SW1-*b* and a plurality of 2-b-th switching elements SW2-*b*. Each of the plurality of 1-b-th switching elements SW1-*b* determines a connection relationship of the n+1-th data line to 2n-th data line DL(n+1) to DL(2*n*) and the (n+1)-a-th sub data line to (2*n*)-a-th sub data line SDL(n+1)-*a* to SDL(2*n*)-a, in accordance with a 1-b-th control signal CS1-*b*. Each of the plurality of 2-b-th switching elements SW2-*b* determines a connection relationship of the n+1-th data line to 2n-th data line DL(n+1) to DL(2*n*) and the (n+1)-b-th sub data line to (2*n*)-b-th sub data line SDL(n+1)-*b* to SDL(2*n*)-b, in accordance with a 2-b-th control signal CS2-*b*.

However, the present disclosure is not limited thereto and as illustrated in FIG. 9, a MUX MX of another display device of the present disclosure can be divided into four sub MUX SMX1, SMX2, SMX3, SMX4.

Specifically, a first sub MUX SMX1 can include a 1-a-th switching element SW1-*a* controlled by the 1-a-th control signal CS1-*a* and a 2-a-th switching element SW2-*a* controlled by the 2-a-th control signal CS2-*a*. A second sub MUX SMX2 can include a 1-b-th switching element SW1-*b* controlled by the 1-b-th control signal CS1-*b* and a 2-b-th switching element SW2-*b* controlled by the 2-b-th control signal CS2-*b*. A third sub MUX SMX3 can include a 1-c-th switching element SW1-*c* controlled by the 1-c-th control signal CS1-*c* and a 2-c-th switching element SW2-*c* controlled by the 2-c-th control signal CS2-*c*. A fourth sub MUX SMX4 can include a 1-d-th switching element SW1-*d* controlled by the 1-d-th control signal CS1-*d* and a 2-d-th switching element SW2-*d* controlled by the 2-d-th control signal CS2-*d*.

As described above, the display device according to still another exemplary embodiment of the present disclosure can divide MUX into a plurality of sub MUX. Therefore, the load which needs to be borne by each of the plurality of sub MUX can be reduced. For example, as the MUX is divided into a plurality of sub MUX, a length of the first control signal line and the second control signal line which drive the sub MUX is reduced so that the load of the sub MUX can be reduced.

Accordingly, the data voltage can be more effectively charged in the sub data lines connected to the plurality of sub MUX. As a result, the data voltage can be fully charged in the plurality of sub pixels so that the degradation of the image quality due to incompletely charged data can be solved.

A specific effect of another exemplary embodiment and still another exemplary embodiment of the present disclosure will be described in more detail with reference to FIGS. 10 and 11.

Figure 10:
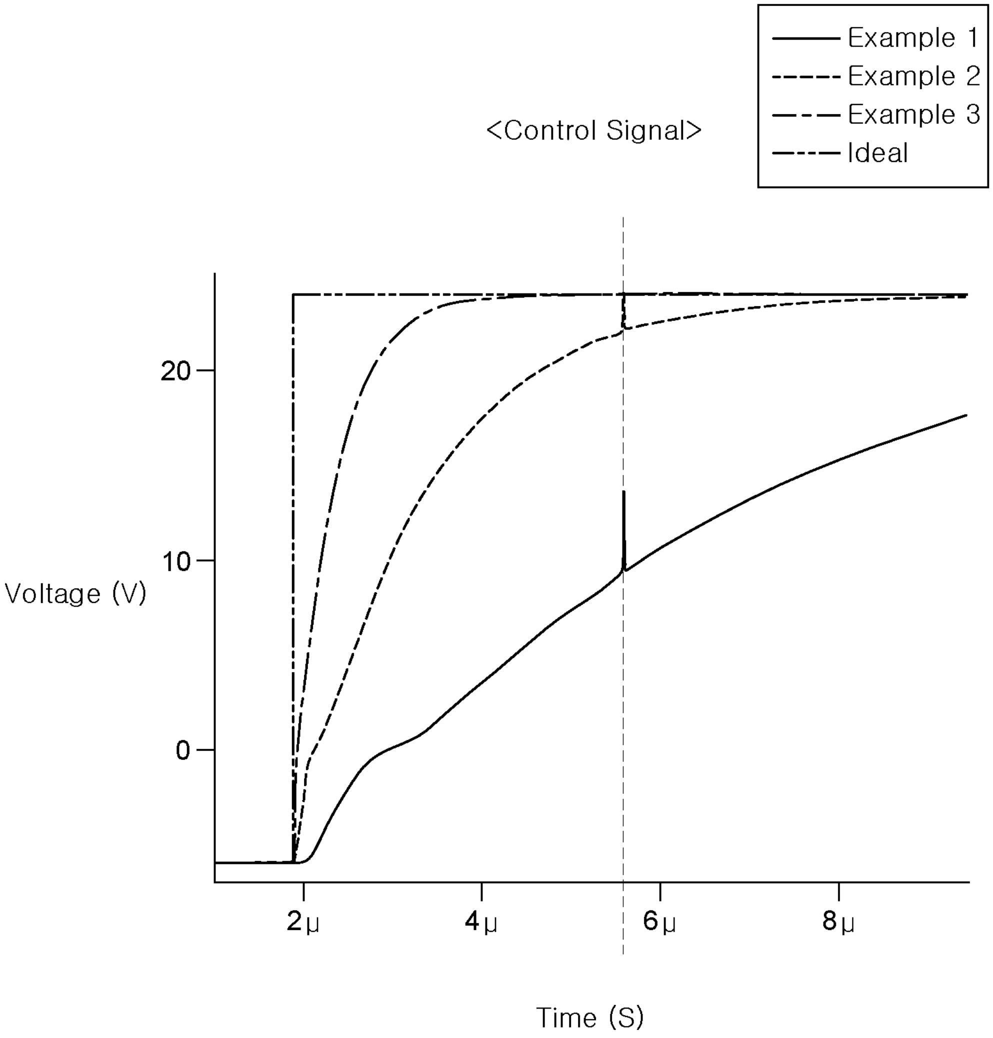
FIG. 10 is a waveform illustrating a control signal of a display device according to another exemplary embodiment and still another exemplary embodiment of the present disclosure.

FIG. 10 is a waveform illustrating a control signal of a display device according to another exemplary embodiment and still another exemplary embodiment of the present disclosure. FIG. 11 is a waveform illustrating a data voltage of a display device according to another exemplary embodiment and still another exemplary embodiment of the present disclosure.

Specifically, the control signal illustrated in FIG. 10 refers to a first control signal and a second control signal of a display device according to another exemplary embodiment and still another exemplary embodiment of the present disclosure. Further, the data voltage illustrated in FIG. 11 indicates a data voltage DATA to be charged in each data line.

Figure 11:
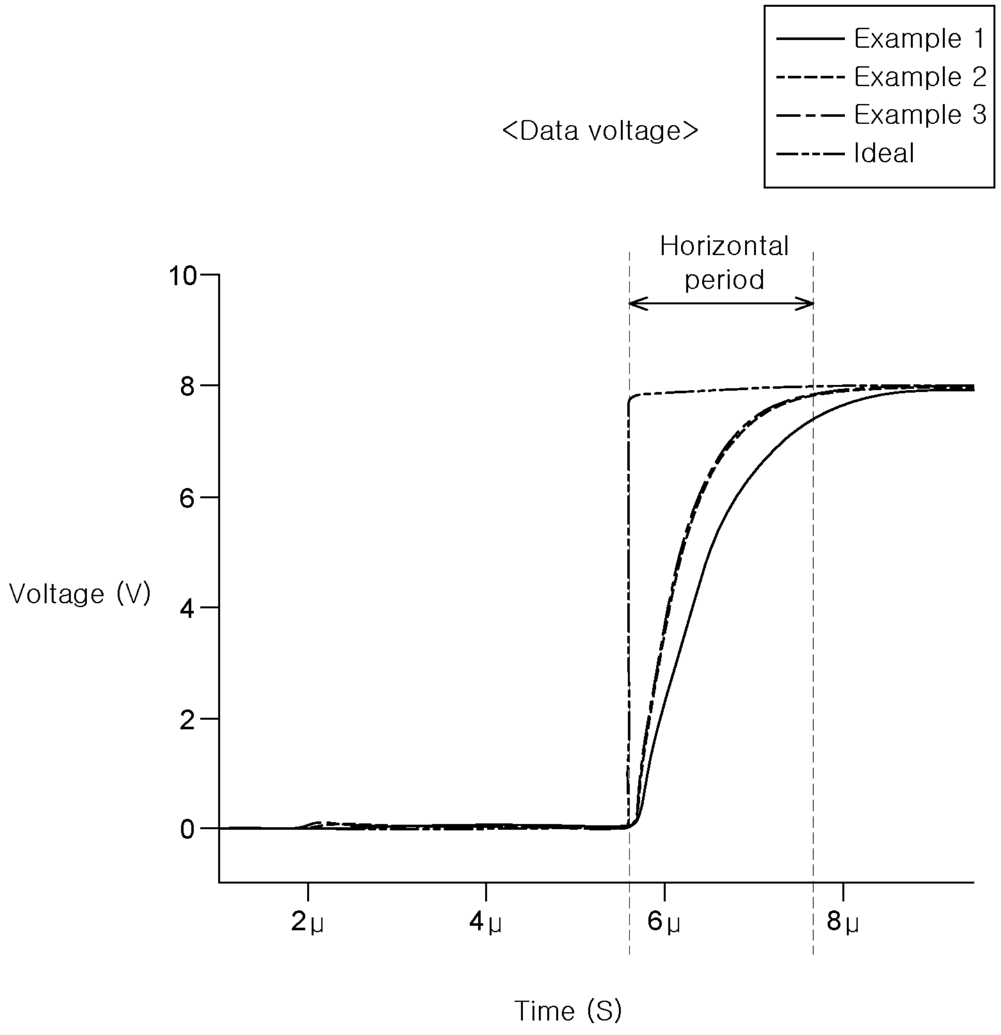
FIG. 11 is a waveform illustrating a data voltage of a display device according to another exemplary embodiment and still another exemplary embodiment of the present disclosure.

In FIGS. 10 and 11, Example 1 indicates a control signal and a data voltage in a display device according to another exemplary embodiment of the present disclosure in which the MUX is not divided. Example 2 indicates a control signal and a data voltage in a display device according to still another exemplary embodiment of the present disclosure in which the MUX is divided into two sub MUX. Further, Example 3 indicates a control signal and a data voltage in a display device according to still another exemplary embodiment of the present disclosure in which the MUX is divided into four sub MUX.

Specifically, referring to FIG. 10, according to Example 1, the control signal is charged by approximately half an ideal control signal during a unit period and according to Example 2, the control signal is charged to be proximity to the ideal control signal during the unit period. Further, according to Example 3, the control signal is charged to a voltage level corresponding to the ideal control signal during the unit period.

Referring to FIG. 11, according to Example 1, during the horizontal period, the data voltage is charged by approximately 89% of an ideal data voltage and according to Example 2, the data voltage is charged by approximately 96% of the ideal data voltage. Further, during the horizontal period, according to Example 3, the data voltage is charged by approximately 97% of the ideal data voltage.

For example, in the display device according to still another exemplary embodiment of the present disclosure, the data voltage can be charged by 95% or more of the ideal data voltage. Accordingly, in the display device according to still another exemplary embodiment of the present disclosure, the data voltage is fully charged in each of the plurality of sub pixels so that the image quality can be improved.

<Still Another Exemplary Embodiment of Present Disclosure (Example 4)—Pixel Symmetric Structure>

Figure 12:
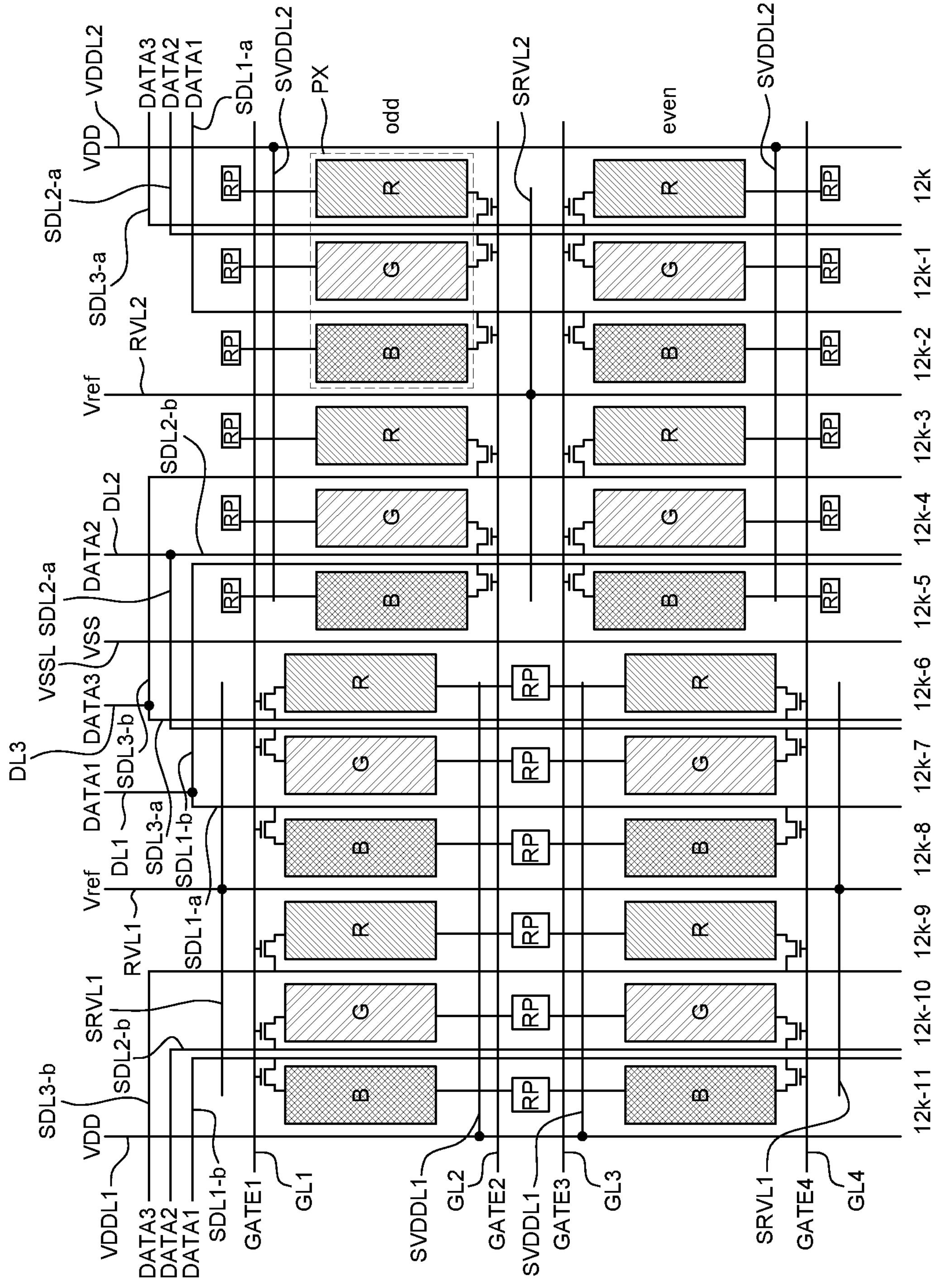
FIG. 12 is a view for explaining a placement relationship of a sub pixel of a display device according to still another exemplary embodiment (Example 4) of the present disclosure.

FIG. 12 is a view for explaining a placement relationship of a sub pixel of a display device according to still another exemplary embodiment (Example 4) of the present disclosure.

In FIG. 12, for the convenience of description, only four pixels PX which are disposed in a 4×2 matrix are illustrated and in the display area, the placement relationship of eight pixels PX disposed in a 4×2 matrix is repeated. Further, the transistor disposed between the sub pixels R, G, B and the data line refers to the switching transistor SWT described with reference to FIG. 2.

Referring to FIG. 12, one pixel PX includes three sub pixels B, G, R. For example, as illustrated in FIG. 12, the pixel PX can include a first sub pixel B, a second sub pixel G, and a third sub pixel R. Further, the first sub pixel B is a blue sub pixel, the second sub pixel G is a green sub pixel, and the third sub pixel R is a red sub pixel. However, the present disclosure is not limited thereto and the plurality of sub pixels can be changed to various colors such as magenta, yellow, and cyan.

The plurality of same color sub pixels B, G, R can be disposed in the same column. For example, the plurality of first sub pixels B is disposed in the same column, the plurality of second sub pixels G is disposed in the same column, and the plurality of third sub pixels R is disposed in the same column.

To be more specific, as illustrated in FIG. 12, the blue sub pixels which are the plurality of first sub pixels B are disposed in a 12 k-11-th column, a 12 k-8-th column, a 12 k-5-th column, and a 12 k-2nd column. Further, the green sub pixels which are the plurality of second sub pixels G are disposed in a 12 k-10-th column, a 12 k-7-th column, a 12 k-4-th column, and a 12 k-1st column and the red sub pixels which are the plurality of third sub pixels R are disposed in a 12 k-9-th column, a 12 k-6-th column, a 12 k-3rd column, and a 12 k-th column. Here, k refers to a natural number of 1 or larger.

For example, the first sub pixels B, the second sub pixels G, and the third sub pixels R are sequentially repeated with respect to one odd-numbered row or one even-numbered row.

Each of a plurality of data lines DL1, DL2, and DL3 can be divided into a plurality of sub data lines SDL1-*a*, SDL1-*b*, SDL2-*a*, SDL2-*b*, SDL3-*a*, SDL3-*b*, respectively. Specifically, the first data line DL1 is divided into a plurality of first sub data lines SDL1-*a* and SDL1-*b*, the second data line DL2 is divided into a plurality of second sub data lines SDL2-*a* and SDL2-*b*, and the third data line DL3 is divided into a plurality of third sub data lines SDL3-*a* and SDL3-*b*.

As described above, the first sub data lines SDL1-*a* and SDL1-*b* can include a 1-a-th sub data line SDL1-*a* and a 1-b-th sub data line SDL1-*b* and the second sub data lines SDL2-*a* and SDL2-*b* can include a 2-a-th sub data line SDL2-*a* and a 2-b-th sub data line SDL2-*b*. Further, the third sub data lines SDL3-*a* and SDL3-*b* can include a 3-a-th sub data line SDL3-*a* and a 3-b-th sub data line SDL3-*b*.

The plurality of first sub data lines SDL1-*a* and SDL1-*b* is disposed to be adjacent to the plurality of first sub pixels B to be connected to the plurality of first sub pixels B.

Specifically, the 1-a-th sub data line SDL1-*a* is disposed between the plurality of first sub pixels B disposed in the 12 k-8-th column and the plurality of second sub pixels G disposed in the 12 k-7-th column to be electrically connected to the plurality of first sub pixels B disposed in the 12 k-8-th column. Alternatively, the 1-a-th sub data line SDL1-*a* is disposed between the plurality of first sub pixels B disposed in the 12 k-2nd column and the plurality of second sub pixels G disposed in the 12 k-1st column to be electrically connected to the plurality of first sub pixels B disposed in the 12 k-2nd column.

The plurality of 1-b-th sub data line SDL1-*b* is disposed between the plurality of first sub pixels B disposed in the 12 k-5-th column and the plurality of second sub pixels G disposed in the 12 k-4-th column to be electrically connected to the plurality of first sub pixels B disposed in the 12 k-5-th column. Alternatively, the plurality of 1-b-th sub data line SDL1-*b* is disposed between the plurality of first sub pixels B disposed in the 12 k-11-th column and the plurality of second sub pixels G disposed in the 12 k-10-th column to be electrically connected to the plurality of first sub pixels B disposed in the 12 k-11-th column.

The plurality of second sub data lines SDL2-*a* and SDL2-*b* is disposed to be adjacent to the plurality of second sub pixels G to be connected to the plurality of second sub pixels G.

Specifically, the 2-a-th sub data line SDL2-*a* is disposed between the plurality of second sub pixels G disposed in the 12 k-7-th column and the plurality of third sub pixels R disposed in the 12 k-6-th column to be electrically connected to the plurality of second sub pixels G disposed in the 12 k-7-th column. Alternatively, the 2-a-th sub data line SDL2-*a* is disposed between the plurality of second sub pixels G disposed in the 12 k-1st column and the plurality of third sub pixels R disposed in the 12 k-th column to be electrically connected to the plurality of second sub pixels G disposed in the 12 k-1st column.

The 2-b-th sub data line SDL2-*b* is disposed between the plurality of first sub pixels B disposed in the 12 k-11-th column and the plurality of second sub pixels G disposed in the 12 k-10-th column to be electrically connected to the plurality of second sub pixels G disposed in the 12 k-10-th column. Alternatively, the 2-b-th sub data line SDL2-*b* is disposed between the plurality of first sub pixels B disposed in the 12 k-5-th column and the plurality of second sub pixels G disposed in the 12 k-4-th column to be electrically connected to the plurality of second sub pixels G disposed in the 12 k-4-th column.

The plurality of third sub data lines SDL3-*a* and SDL3-*b* is disposed to be adjacent to the plurality of third sub pixels R to be connected to the plurality of third sub pixels R.

Specifically, the 3-a-th sub data line SDL3-*a* is disposed between the plurality of second sub pixels G disposed in the 12 k-7-th column and the plurality of third sub pixels R disposed in the 12 k-6-th column to be electrically connected to the plurality of third sub pixels R disposed in the 12 k-6-th column. Alternatively, the 3-a-th sub data line SDL3-*a* is disposed between the plurality of second sub pixels G disposed in the 12 k-1st column and the plurality of third sub pixels R disposed in the 12 k-th column to be electrically connected to the plurality of third sub pixels R disposed in the 12 k-th column.

The 3-b-th sub data line SDL3-*b* is disposed between the plurality of second sub pixels G disposed in the 12 k-10-th column and the plurality of third sub pixels R disposed in the 12 k-9-th column to be electrically connected to the plurality of third sub pixels R disposed in the 12 k-9-th column. Alternatively, the 3-b-th sub data line SDL3-*b* is disposed between the plurality of second sub pixels G disposed in the 12 k-1st column and the plurality of third sub pixels R disposed in the 12 k-th column to be electrically connected to the plurality of third sub pixels R disposed in the 12 k-th column.

A first data voltage DATA1 which is a blue data voltage is applied to the first data line DL1, a second data voltage DATA2 which is a green data voltage is applied to the second data line DL2, and a third data voltage DATA3 which is a red data voltage is applied to the third data line DL3.

Therefore, the first data voltage DATA1 which is a blue data voltage is applied to the plurality of first sub data lines SDL1-*a* and SDL1-*b* and the second data voltage DATA2 which is a green data voltage is applied to the plurality of second sub data line SDL2-*a* and SDL2-*b*. Further, the third data voltage DATA3 which is a red data voltage is applied to the plurality of third sub data lines SDL3-*a* and SDL3-*b*.

Each of the plurality of gate lines GL1 to GL4 can be disposed on both sides of the plurality of sub pixels B, G, R, and two gate lines GL2 and GL3 can be disposed between the plurality of sub pixels B, G, R.

Specifically, referring to FIG. 12, the first gate line GL1 and the second gate line GL2 are disposed on both sides of the plurality of sub pixels B, G, R in the odd-numbered rows and the third gate line GL3 and the fourth gate line GL4 are disposed on both sides of the plurality of sub pixels B, G, R in the even-numbered rows.

Therefore, the first gate line GL1 can be disposed on one side of the plurality of sub pixels B, G, R in the odd-numbered rows. Further, the second gate line GL2 and the third gate line GL3 are disposed between the plurality of sub pixels B, G, R in the odd-numbered rows and the plurality of sub pixels B, G, R in the even-numbered rows. Further, the fourth gate line GL4 can be disposed on the other side of the plurality of sub pixels B, G, R in the even-numbered rows. One side described above refers to a direction in a plurality of sub pixels of a previous row is disposed and the other side refers to a direction in which a plurality of sub pixels of a subsequent row is disposed.

In the meantime, each of the plurality of pixels PX can be connected to the same gate lines GL1 to GL4.

Specifically, referring to FIG. 12, the sub pixels B, G, R disposed in the 12 k-11-th column to 12 k-6-th column of the odd-numbered row are connected to the first gate line GL1. Further, the sub pixels B, G, R disposed in the 12 k-5-th column to 12 k-th column of the odd-numbered row are connected to the second gate line GL2. Further, the sub pixels B, G, R disposed in the 12 k-5-th column to 12 k-th column of the even-numbered row are connected to the third gate line GL3. Further, the sub pixels B, G, R disposed in the 12 k-11-th column to 12 k-6-th column of the even-numbered row are connected to the fourth gate line GL4.

In the meantime, the sub pixels B, G, R disposed in the 12 k-11-th column to 12 k-6-th column are disposed to be more adjacent to the first gate line GL1 and the fourth gate line GL4 than the second gate line GL2 and the third gate line GL3. The sub pixels B, G, R disposed in the 12 k-5-th column to 12 k-th column are disposed to be more adjacent to the second gate line GL2 and the third gate line GL3 than the first gate line GL1 and the fourth gate line GL4.

Specifically, referring to FIG. 12, the sub pixels B, G, R disposed in the 12 k-11-th column to 12 k-6-th column of the odd-numbered row are disposed to be more adjacent to the first gate line GL1 than the second gate line GL2. Further, the sub pixels B, G, R disposed in the 12 k-5-th column to 12 k-th column of the odd-numbered row are disposed to be more adjacent to the second gate line GL2 than the first gate line GL1. Further, the sub pixels B, G, R disposed in the 12 k-5-th column to 12 k-th column of the even-numbered row are disposed to be more adjacent to the third gate line GL3 than the fourth gate line GL4. Further, the sub pixels B, G, R disposed in the 12 k-11-th column to 12 k-6-th column of the even-numbered row are disposed to be more adjacent to the fourth gate line GL4 than the third gate line GL3.

For example, in the display device according to still another exemplary embodiment (Example 4) of the present disclosure, the placement relationship of the plurality of sub pixels B, R, G can be original symmetry.

The plurality of reference voltage lines RVL1 and RVL2, the plurality of high potential voltage lines VDDL1 and VDDL2, and the low potential voltage line VSSL can be disposed between a plurality of adjacent pixels PX.

Specifically, the plurality of high potential voltage lines VDDL1 and VDDL2 can be disposed at the outside of the plurality of first sub pixels B disposed in the 12 k-11-th column or an outside of the plurality of third sub pixels R disposed in the 12 k-th column.

The first high potential voltage line VDDL1 can be disposed at the outside of the plurality of first sub pixels B disposed in the 12 k-11-th column and the second high potential voltage line VDDL2 can be disposed at the outside of the plurality of third sub pixels R disposed in the 12 k-th column.

Each of the high potential voltage lines VDDL1 and VDDL2 can be divided into a plurality of sub high potential voltage lines SVDDL1 and SVDDL2.

The first high potential voltage line VDDL1 can be divided into a plurality of first sub high potential voltage lines SVDDL1. The plurality of first sub high potential voltage lines SVDDL1 can be disposed between the sub pixels B, G, R disposed in the 12 k-11-th column to 12 k-6-th column in the odd-numbered row and the sub pixels B, G, R disposed in the 12 k th column to 12 k-6-th column in the even-numbered row.

In other words, the high potential voltage line is disposed between the sub pixels B, G, R disposed in the 12 k th column to 12 k-6-th column in the odd-numbered row and the sub pixels B, G, R disposed in the 12 k-11-th column to 12 k-6-th column in the even-numbered row to apply a high potential voltage to the sub pixels B, G, R disposed in the 12 k-11-th column to 12 k-6-th column.

The second high potential voltage line VDDL2 can be divided into a plurality of second sub high potential voltage lines SVDDL2. The plurality of second sub high potential voltage lines SVDDL2 can be disposed on one side of the sub pixels B, G, R disposed in the 12 k-5-th column to 12 k-th column in the odd-numbered row and the other side of the sub pixels B, G, R disposed in the 12 k-5-th column to 12 k-th column in the even-numbered row.

In other words, the high potential voltage line is disposed in one side of the sub pixels B, G, R disposed in the 12 k-5-th column to 12 k-th column in the odd-numbered row and the other side of the sub pixels B, G, R disposed in the 12 k-5-th column to 12 k-th column in the even-numbered row to apply a high potential voltage to the sub pixels B, G, R disposed in the 12 k-5-th column to 12 k-th column.

In the meantime, the plurality of reference voltage lines RVL1 and RVL2 can be disposed between the plurality of third sub pixels R disposed in the 12 k-9-th column and the plurality of first sub pixels B disposed in the 12 k-8-th column. Further, the plurality of reference voltage lines RVL1 and RVL2 can be disposed between the plurality of third sub pixels R disposed in the 12 k-3rd column and the plurality of first sub pixels B disposed in the 12 k-2nd column.

Specifically, the first reference voltage line RVL1 can be disposed between the plurality of third sub pixels R disposed in the 12 k-9-th column and the plurality of first sub pixels B disposed in the 12 k-8-th column. The second reference voltage line RVL2 can be disposed between the plurality of third sub pixels R disposed in the 12 k-3rd column and the plurality of first sub pixels B disposed in the 12 k-2nd column.

Each of the plurality of reference voltage lines RVL1 and RVL2 can be divided into a plurality of sub reference voltage lines SRVL1 and SRVL2.

Specifically, the first reference voltage line RVL1 can be divided into a plurality of first sub reference voltage line SRVL1. The plurality of first sub reference voltage lines SRVL1 can be disposed on one side of the sub pixels B, G, R disposed in the 12 k-11-th column to 12 k-6-th column in the odd-numbered row and the other side of the sub pixels B, G, R disposed in the 12 k-11-th column to 12 k-6-th column in the even-numbered row.

In other words, the reference voltage line is disposed in one side of the sub pixels B, G, R disposed in the 12 k-11-th column to 12 k-6-th column in the odd-numbered row and the other side of the sub pixels B, G, R disposed in the 12 k-11-th column to 12 k-6-th column in the even-numbered row to apply a reference voltage to the sub pixels B, G, R disposed in the 12 k-11-th column to 12 k-6-th column.

Further, the second reference voltage line RVL2 can be divided into a plurality of second sub reference voltage line SRVL2. The second sub reference voltage line SRVL2 can be disposed between the sub pixels B, G, R disposed in the 12 k-5-th column to 12 k-th column in the odd-numbered row and the sub pixels B, G, R disposed in the 12 k-5-th column to 12 k-th column in the even-numbered row.

In other words, the reference voltage line is disposed between the sub pixels B, G, R disposed in the 12 k-5-th column to 12 k-th column in the odd-numbered row and the sub pixels B, G, R disposed in the 12 k-5-th column to 12 k-th column in the even-numbered row to apply a reference voltage to the sub pixels B, G, R disposed in the 12 k-5-th column to 12 k-th column.

The low potential voltage line VSSL is disposed between the third sub pixel R disposed in the 12 k-6-th column and the first sub pixel B disposed in the 12 k-5-th column to apply a low potential voltage VSS to the sub pixels B, G, R disposed in the 12 k-11-th column to 12 k-th column.

In the meantime, the display device according to still another exemplary embodiment of the present disclosure can include a plurality of repair patterns RP which can connect adjacent sub pixels B, G, R.

Specifically, the plurality of repair patterns RP can be disposed between the sub pixels B, G, R disposed in the 12 k-11-th column to 12 k-6-th column in the odd-numbered row and the sub pixels B, G, R disposed in the 12 k-11-th column to 12 k-6-th column in the even-numbered row. The plurality of repair patterns RP can be connected to the plurality of sub pixels B, G, R disposed in the same column.

Therefore, if any one sub pixel among the sub pixels B, G, R disposed in the 12 k-11-th column to 12 k-6-th column is defective, the repair pattern RP connected to a defective sub pixel is welded to electrically connect the defective sub pixel and a sub pixel disposed in the same column. By doing this, the defective sub pixel is repaired to emit light.

Further, the plurality of repair patterns RP can be disposed on one side of the sub pixels B, G, R disposed in the 12 k-5-th column to 12 k-th column in the odd-numbered row and the other side of the sub pixels B, G, R disposed in the 12 k-5-th column to 12 k-th column in the even-numbered row. The plurality of repair patterns RP can be connected to the plurality of sub pixels B, G, R disposed in the same column.

Therefore, if any one sub pixel among the sub pixels B, G, R disposed in the 12 k-5-th column to 12 k-th column is defective, the repair pattern RP connected to a defective sub pixel is welded to electrically connect the defective sub pixel and a sub pixel disposed in the same column. By doing this, the defective sub pixel is repaired to emit light.

Figure 13:
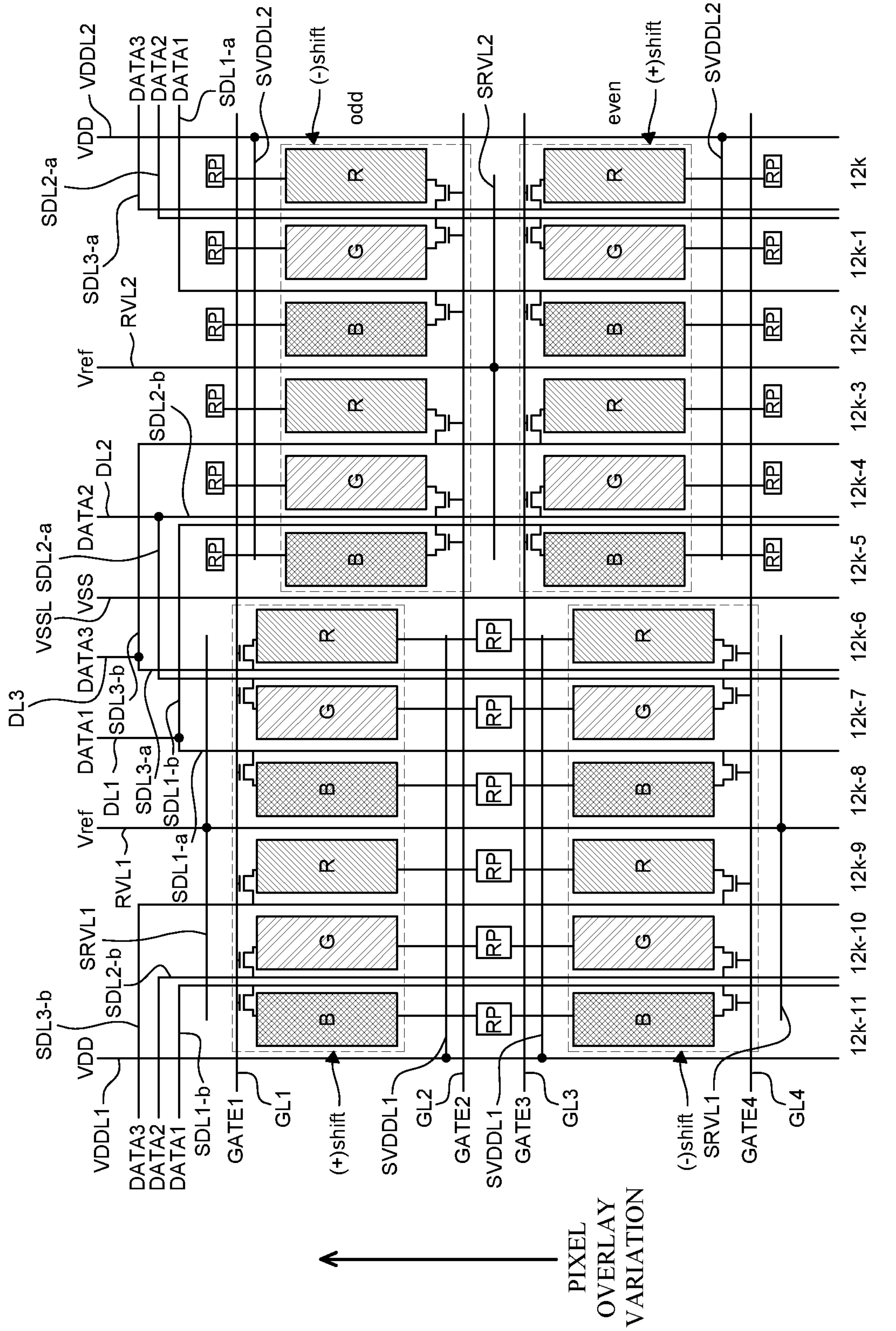
FIG. 13 is a view for explaining overlay variation of a sub pixel of a display device according to still another exemplary embodiment (Example 4) of the present disclosure.

FIG. 13 is a view for explaining overlay variation of a sub pixel of a display device according to still another exemplary embodiment (Example 4) of the present disclosure.

Due to the issue of the process of the display device, when the plurality of sub pixels is formed, the overlay of the plurality of sub pixels can vary.

Referring to FIG. 13, only the plurality of sub pixels B, G, R can be formed to be shifted to one side. Therefore, the overlay variation of the plurality of sub pixels B, G, R and the gate line connected to the plurality of sub pixels B, G, R can occur.

Specifically, the sub pixels B, G, R disposed in the 12 k-11-th column to 12 k-6-th column of the odd-numbered row is closer to the first gate line GL1 so that the overlay of the sub pixels B, G, R disposed in the 12 k-11-th column to 12 k-6-th column of the odd-numbered row and the first gate line GL1 can be increased ((+)shift).

In contrast, the sub pixels B, G, R disposed in the 12 k-11-th column to 12 k-6-th column of the even-numbered row is farther from the fourth gate line GL4 so that the overlay of the sub pixels B, G, R disposed in the 12 k-11-th column to 12 k-6-th column of the even-numbered row and the fourth gate line GL4 can be reduced ((−)shift).

Further, the sub pixels B, G, R disposed in the 12 k-5-th column to 12 k-th column of the odd-numbered row is farther from the second gate line GL2 so that the overlay of the sub pixels B, G, R disposed in the 12 k-5-th column to 12 k-th column of the odd-numbered row and the second gate line GL2 can be reduced ((−) shift).

Further, the sub pixels B, G, R disposed in the 12 k-5-th column to 12 k-th column of the even-numbered row is closer to the third gate line GL3 so that the overlay of the sub pixels B, G, R disposed in the 12 k-5-th column to 12 k-th column of the even-numbered row and the third gate line GL3 can be increased ((+)shift).

Therefore, the overlay of the sub pixels B, G, R disposed in the 12 k-11-th column to 12 k-6-th column of the odd-numbered row and the first gate line GL1 is increased ((+) shift) so that a driving current can be increased.

Moreover, the overlay of the sub pixels B, G, R disposed in the 12 k-11-th column to 12 k-6-th column of the even-numbered row and the fourth gate line GL4 is reduced ((−) shift) so that a driving current can be reduced.

Also, the overlay of the sub pixels B, G, R disposed in the 12 k-5-th column to 12 k-th column of the odd-numbered row and the second gate line GL2 is reduced ((−) shift) so that a driving current can be reduced.

In addition, the overlay of the sub pixels B, G, R disposed in the 12 k-5-th column to 12 k-th column of the even-numbered row and the third gate line GL3 is increased ((+) shift) so that a driving current can be increased.

For example, in the display device according to still another exemplary embodiment (Example 4) of the present disclosure, even though the overlay of the sub pixel varies, the driving current of adjacent pixels are not increased or reduced.

For example, in the display device according to still another exemplary embodiment (Example 4) of the present disclosure, even though the overlay of the sub pixel varies, the driving current of pixels disposed in the same line are not constantly increased or reduced. Accordingly, the vertical line or horizontal line due to the overlay variation may not occur.

Further, in the display device according to still another exemplary embodiment (Example 4) of the present disclosure, in the plurality of sub pixels, sub high potential voltage lines, sub reference voltage lines, and repair patterns can be disposed. Accordingly, the components disposed in the display panel are integrated so that an aperture ratio of the display panel can also be increased.

The exemplary embodiments of the present disclosure can also be described as follows:

According to an aspect of the present disclosure, a display device includes a display panel in which a plurality of pixels including a first sub pixel, a second sub pixel, a third sub pixel, and a fourth sub pixel each having a different color are disposed; a data driver configured to supply a data voltage to the plurality of pixels by using a plurality of data lines; and a gate driver configured to supply a gate signal to the plurality of pixels by using a plurality of gate lines, each of the plurality of data lines is divided into a plurality of sub data lines and each of the plurality of sub data lines is connected to a plurality of sub pixels having the same color, thereby minimizing data transition of a data voltage.

A plurality of first sub pixels provided in the plurality of pixels can be disposed in the same column, a plurality of second sub pixels provided in the plurality of pixels can be disposed in the same column, a plurality of third sub pixels provided in the plurality of pixels can be disposed in the same column, and a plurality of fourth sub pixels provided in the plurality of pixels can be disposed in the same column.

The first sub pixel can be a red sub pixel, the second sub pixel can be a white sub pixel, the third sub pixel can be a blue sub pixel, and the fourth sub pixel can be a green sub pixel.

The plurality of sub data lines can include a plurality of first sub data lines which is connected to a plurality of first sub pixels disposed in the plurality of pixels, a plurality of second sub data lines which is connected to a plurality of second sub pixels disposed in the plurality of pixels, a plurality of third sub data lines which is connected to a plurality of third sub pixels disposed in the plurality of pixels and a plurality of fourth sub data lines which is connected to a plurality of fourth sub pixels disposed in the plurality of pixels.

The first sub data line and the second sub data line can be disposed between the first sub pixel and the second sub pixel and the third sub data line and the fourth sub data line can be disposed between the third sub pixel and the fourth sub pixel.

Each of the plurality of pixels can be connected to the same gate line and two adjacent pixels among the plurality of pixels can be connected to different gate lines.

When the display panel implements a single color screen or a vertical pattern screen, the data voltage can be constantly maintained for one frame.

Each of the first sub pixel, the second sub pixel, the third sub pixel, and the fourth sub pixel can include a switching transistor, a driving transistor, a storage capacitor, a sensing transistor, and a light emitting diode.

The display panel can further include a plurality of reference voltage lines connected to the sensing transistor; and a plurality of high potential voltage lines connected to the driving transistor, and each of the plurality of reference voltage lines is disposed in one pixel, and each of the plurality of high potential voltage lines is disposed between a plurality of adjacent pixels.

The display device can further comprise a multiplexer (MUX) which is disposed between the plurality of data lines and the plurality of sub data lines and controls a connection relationship of the plurality of data lines and the plurality of sub data lines in accordance with a control signal.

The MUX can include a plurality of first switching elements which connects the data line and any one of the plurality of sub data lines, in accordance with a first control signal and a plurality of second switching elements which connects the data line and the other one of the plurality of sub data lines, in accordance with a second control signal.

The MUX can be combined as one to apply one first control signal to the plurality of first switching elements and apply one second control signal to the plurality of second switching elements.

The MUX can be divided into a plurality of sub MUX so that each of the plurality of sub MUX includes a plurality of first switching elements and a plurality of second switching elements and a separate first control signal and a separate second control signal are applied to each of the plurality of sub MUX.

According to another aspect of the present disclosure, a display device includes a display panel in which a plurality of sub pixels having different colors is disposed; a data driver configured to supply a data voltage to the plurality of sub pixels by using a plurality of data lines; and a gate driver configured to supply a gate signal to the plurality of sub pixels by using a plurality of gate lines, each of the plurality of data lines is divided into a plurality of sub data lines and each of the plurality of sub data lines is connected to sub pixels having the same color. The plurality of gate lines includes a first gate line disposed on one side of a plurality of sub pixels disposed in odd-numbered rows, a second gate line and a third gate line disposed between a plurality of sub pixels disposed in the odd-numbered rows and a plurality of sub pixels disposed in even-numbered rows; and a fourth gate line disposed on the other side of the plurality of sub pixels disposed in even-numbered rows, a plurality of sub pixels disposed in a 12 k-11-th column to a 12 k-6-th column is disposed to be more adjacent to the first gate line and the fourth gate line than the second gate line and the third gate line, and a plurality of sub pixels disposed in a 12 k-5-th column to a 12 k-th column is disposed to be more adjacent to the second gate line and the third gate line than the first gate line and the fourth gate line. Therefore, even though the overlay of the sub pixels varies, the image can be uniform.

The plurality of sub pixels disposed in a 12 k-11-th column to a 12 k-6-th column of the odd-numbered rows can be connected to the first gate line and can be disposed to be more adjacent to the first gate line than the second gate line and the plurality of sub pixels disposed in a 12 k-5-th column to a 12 k-th column of the odd-numbered rows can be connected to the second gate line and can be disposed to be more adjacent to the second gate line than the first gate line.

The plurality of sub pixels can be disposed in a 12 k-11-th column to a 12 k-6-th column of the even-numbered rows can be connected to the fourth gate line and can be disposed to be more adjacent to the fourth gate line than the third gate line and the plurality of sub pixels can be disposed in a 12 k-5-th column to a 12 k-th column of the even-numbered rows can be connected to the third gate line and can be disposed to be more adjacent to the third gate line than the fourth gate line.

Among the plurality of sub pixels, a plurality of sub pixels can be disposed in a 12 k-11-th column, a 12 k-8-th column, a 12 k-5-th column, and a 12 k-2nd column can be blue sub pixels, among the plurality of sub pixels, a plurality of sub pixels can be disposed in a 12 k-10-th column, a 12 k-7-th column, a 12 k-4-th column, and a 12 k-1st column can be green sub pixels, and among the plurality of sub pixels, a plurality of sub pixels can be disposed in a 12 k-9-th column, a 12 k-6-th column, a 12 k-3rd column, and a 12 k-th column can be red sub pixels.

A plurality of repair patterns can be disposed between a plurality of sub pixels can be disposed in a 12 k-11-th column to a 12 k-6-th column of the odd-numbered row and a plurality of sub pixels can be disposed in a 12 k-11-th column to a 12 k-6-th column of the even-numbered row.

A plurality of repair patterns can be disposed on one side of a plurality of sub pixels can be disposed in a 12 k-5-th column to a 12 k-th column of the odd-numbered row and the other side of a plurality of sub pixels can be disposed in a 12 k-5-th column to a 12 k-th column of the even-numbered row.

At least one high potential voltage line can be disposed between a plurality of sub pixels can be disposed in a 12 k-11-th column to a 12 k-6-th column of the odd-numbered row and a plurality of sub pixels can be disposed in a 12 k-11-th column to a 12 k-6-th column of the even-numbered row.

At least one high potential voltage line can be disposed on one side of a plurality of sub pixels can be disposed in a 12 k-5-th column to a 12 k-th column of the odd-numbered row and the other side of a plurality of sub pixels can be disposed in a 12 k-5-th column to a 12 k-th column of the even-numbered row.

At least one reference voltage line can be disposed on one side of a plurality of sub pixels can be disposed in a 12 k-11-th column to a 12 k-6-th column of the odd-numbered row and the other side of a plurality of sub pixels can be disposed in a 12 k-11-th column to a 12 k-6-th column of the even-numbered row.

At least one high potential voltage line can be disposed between a plurality of sub pixels can be disposed in a 12 k-5-th column to a 12 k-th column of the odd-numbered row and a plurality of sub pixels can be disposed in a 12 k-5-th column to a 12 k-th column of the even-numbered row.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a display panel in which a plurality of pixels are disposed, each of the plurality of pixels including a plurality of sub pixels having different colors;

a data driver configured to supply a data voltage to the plurality of pixels by using a plurality of data lines; and a gate driver configured to supply a gate signal to the plurality of pixels by using a plurality of gate lines, wherein each of the plurality of data lines is divided into a plurality of sub data lines, and each of the plurality of sub data lines is connected to a plurality of sub pixels having the same color, wherein a plurality of sub pixels having the same color provided in the plurality of pixels is disposed in a same column, and the plurality of sub pixels in the same column is connected to each of the plurality sub data lines, wherein the number of sub data lines branching from one of a data line has the same number of gate lines which is connected to the plurality of pixels in a same row, and wherein, when the display panel implements a vertical pattern screen, gate signals each having a gate-on voltage are sequentially supplied to a group of sub pixels disposed in odd-numbered rows among the plurality of sub pixels for one frame, a gate-off voltage is supplied to a group of sub pixels disposed in even-numbered rows among the plurality of sub pixels for the one frame, and the data voltage is constantly maintained for the one frame.

2. The display device according to claim 1, wherein each of the plurality of pixels including a first sub pixel, a second sub pixel, a third sub pixel, and a fourth sub pixel, the plurality of first sub pixels provided in the plurality of pixels is disposed in a same column, the plurality of second sub pixels provided in the plurality of pixels is disposed in a same column, the plurality of third sub pixels provided in the plurality of pixels is disposed in a same column, and the plurality of fourth sub pixels provided in the plurality of pixels is disposed in a same column.

3. The display device according to claim 1, wherein the first sub pixel is a red sub pixel, the second sub pixel is a white sub pixel, the third sub pixel is a blue sub pixel, and the fourth sub pixel is a green sub pixel.

4. The display device according to claim 1, wherein the plurality of sub data lines include:

a plurality of first sub data lines which is connected to a plurality of first sub pixels disposed in the plurality of pixels;

a plurality of second sub data lines which is connected to a plurality of second sub pixels disposed in the plurality of pixels;

a plurality of third sub data lines which is connected to a plurality of third sub pixels disposed in the plurality of pixels; and a plurality of fourth sub data lines which is connected to a plurality of fourth sub pixels disposed in the plurality of pixels.

5. The display device according to claim 4, wherein one of the first sub data lines and one of the second sub data lines are disposed between the first sub pixel and the second sub pixel, and the one of third sub data lines and one of the fourth sub data lines are disposed between the third sub pixel and the fourth sub pixel.

6. The display device according to claim 1, wherein each of the plurality of pixels is connected to a same gate line.

7. The display device according to claim 1, wherein two adjacent pixels among the plurality of pixels are connected to different gate lines.

8. The display device according to claim 1, wherein when the display panel implements a single color screen or a vertical pattern screen, the data voltage is constantly maintained for the one frame.

9. The display device according to claim 1, wherein each of the plurality of sub pixels includes a switching transistor, a driving transistor, a storage capacitor, a sensing transistor, and a light emitting diode.

10. The display device according to claim 9, wherein the display panel further includes:

a plurality of reference voltage lines connected to the sensing transistor; and a plurality of high potential voltage lines connected to the driving transistor, and each of the plurality of reference voltage lines is disposed in one pixel, and each of the plurality of high potential voltage lines is disposed between a plurality of adjacent pixels among the plurality of pixels.

11. The display device according to claim 1, further comprising:

a multiplexer (MUX) which is disposed between the plurality of data lines and the plurality of sub data lines and controls a connection relationship of the plurality of data lines and the plurality of sub data lines in accordance with a control signal.

12. The display device according to claim 11, wherein the MUX includes:

a plurality of first switching elements which connects a data line of the plurality of data lines and any one of the plurality of sub data lines, in accordance with a first control signal; and a plurality of second switching elements which connects a data line the plurality of data lines and another one of the plurality of sub data lines, in accordance with a second control signal.

13. The display device according to claim 12, wherein the MUX is constituted by one MUX to apply one first control signal to the plurality of first switching elements and apply one second control signal to the plurality of second switching elements.

14. The display device according to claim 12, wherein the MUX is divided into a plurality of sub MUX so that each of the plurality of sub MUX includes a plurality of first switching elements and a plurality of second switching elements, and a separate first control signal and a separate second control signal are applied to each of the plurality of sub MUX.

* * * * *